(12) United States Patent
Shigeta

(10) Patent No.: US 10,609,268 B2
(45) Date of Patent: Mar. 31, 2020

(54) CONTROL APPARATUS, LENS APPARATUS, AND IMAGING APPARATUS

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 15/726,891

(22) Filed: Oct. 6, 2017

(65) Prior Publication Data

US 2018/0103187 A1 Apr. 12, 2018

(30) Foreign Application Priority Data

Oct. 12, 2016 (JP) .................................. 2016-200826

(51) Int. Cl.
*H04N 5/232* (2006.01)
*G02B 7/04* (2006.01)

(52) U.S. Cl.
CPC .......... *H04N 5/23203* (2013.01); *G02B 7/04* (2013.01); *H04N 5/23209* (2013.01); *H04N 5/23293* (2013.01)

(58) Field of Classification Search
CPC .............................................. H04N 5/23293

USPC ......................................................... 348/345
See application file for complete search history.

(56) References Cited

U.S. PATENT DOCUMENTS

2011/0243540 A1* 10/2011 Kato ........................ G02B 7/08
396/99
2016/0116824 A1* 4/2016 Okawa .................. G03B 13/34
396/81

FOREIGN PATENT DOCUMENTS

JP 2005159964 A 6/2005
JP 4609685 B2 1/2011

* cited by examiner

*Primary Examiner* — Anthony J Daniels
(74) *Attorney, Agent, or Firm* — Rossi, Kimms & McDowell LLP

(57) ABSTRACT

A control apparatus which performs control of a movable optical member of an optical apparatus based on a first operation amount of a first operation device and a second operation amount of a second operation device, comprises: a storage that stores information of a first operation sensitivity of the first operation device and a second operation sensitivity of the second operation device; and a processor configured to generate a target value for the control based on the first operation amount, the second operation amount, and the first operation sensitivity and the second operation sensitivity of which information is stored in the storage.

17 Claims, 13 Drawing Sheets

FIG. 2

OPERATION UNIT INFORMATION 1

OPERATION UNIT TYPE INFORMATION

| ITEM | VALUE |
|---|---|
| OPERATION RANGE LIMIT | YES |

OPERATION UNIT SETTING INFORMATION

| ITEM | VALUE |
|---|---|
| OPERATION TYPE | BASIC OPERATION |
| OPERATION SENSITIVITY | SENSITIVITY MODE 1 |

OPERATION UNIT CONNECTION INTERFACE INFORMATION

| ITEM | VALUE |
|---|---|
| IF PHYSICAL POSITION | CAMERA SIDE |
| IF FUNCTION | OPERATION MEMBER COMMUNICATION |

OPERATION UNIT INFORMATION 2

OPERATION UNIT TYPE INFORMATION

| ITEM | VALUE |
|---|---|
| OPERATION RANGE LIMIT | NO |

OPERATION UNIT SETTING INFORMATION

| ITEM | VALUE |
|---|---|
| OPERATION TYPE | CORRECTION OPERATION |
| OPERATION SENSITIVITY | SENSITIVITY MODE 2 |

OPERATION UNIT CONNECTION INTERFACE INFORMATION

| ITEM | VALUE |
|---|---|
| IF PHYSICAL POSITION | INTERMEDIATE POSITION |
| IF FUNCTION | • OPERATION MEMBER COMMUNICATION<br>• OPTICAL MEMBER POSITION SIGNAL OUTPUT |

OPERATION UNIT INFORMATION 3

OPERATION UNIT TYPE INFORMATION

| ITEM | VALUE |
|---|---|
| OPERATION RANGE LIMIT | NO |

OPERATION UNIT SETTING INFORMATION

| ITEM | VALUE |
|---|---|
| OPERATION TYPE | CORRECTION OPERATION |
| OPERATION SENSITIVITY | SENSITIVITY MODE 3 |

OPERATION UNIT CONNECTION INTERFACE INFORMATION

| ITEM | VALUE |
|---|---|
| IF PHYSICAL POSITION | OBJECT SIDE |
| IF FUNCTION | OPERATION MEMBER COMMUNICATION |

FIG. 3A1
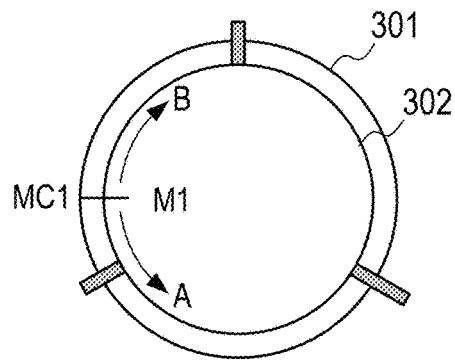
FIG. 3B1
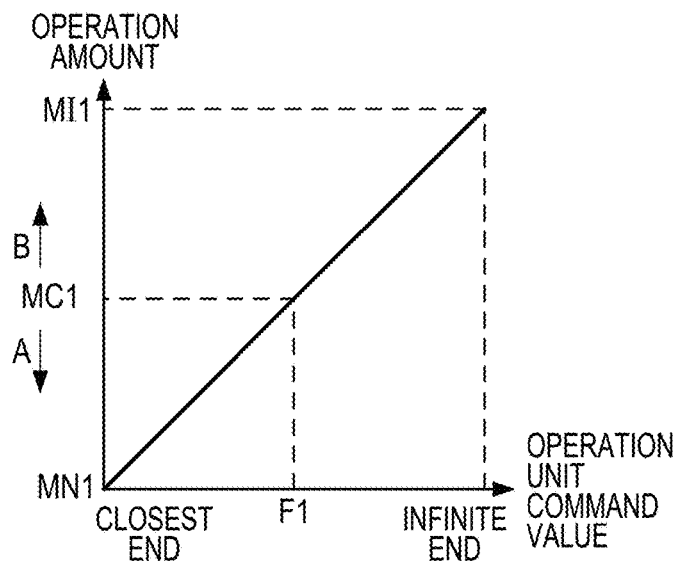
FIG. 3A2
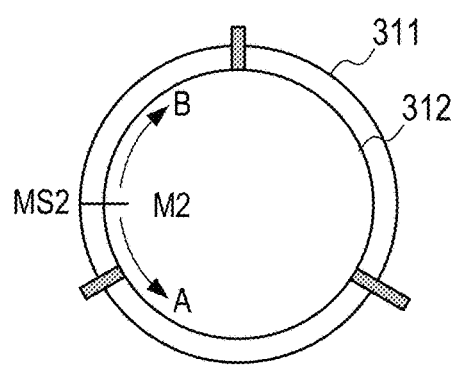
FIG. 3B2
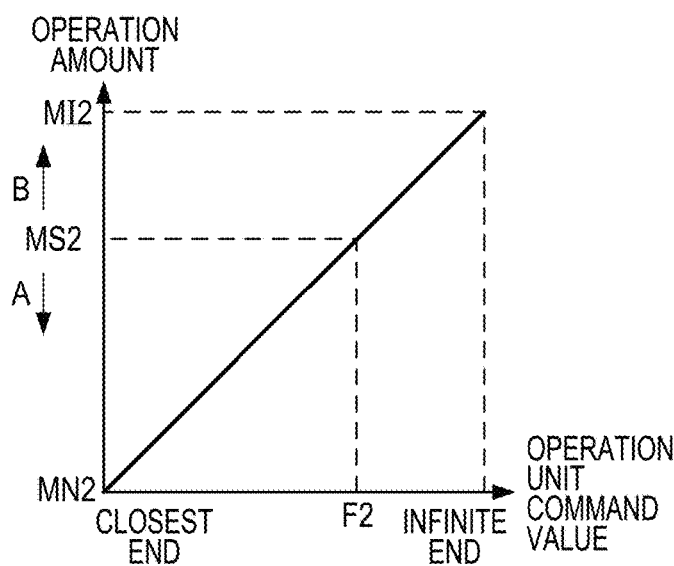

FIG. 7A
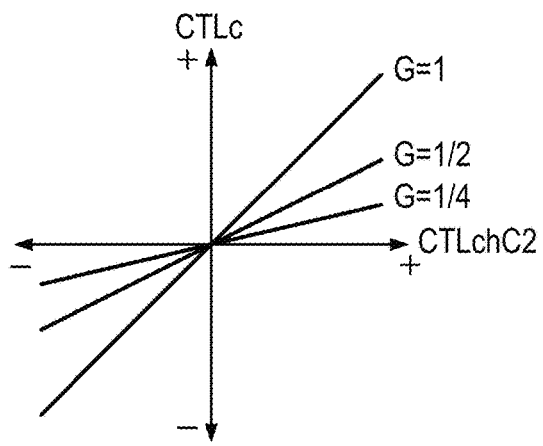
FIG. 7B1
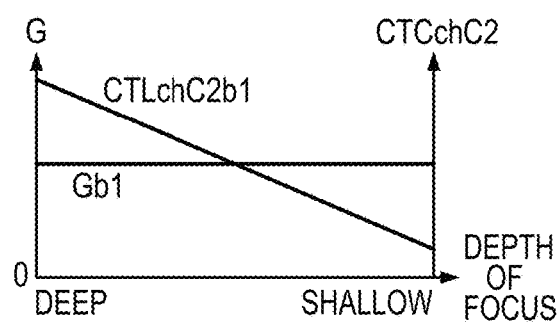
FIG. 7B2
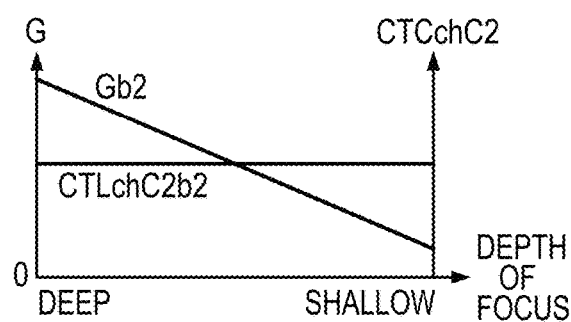
FIG. 7C
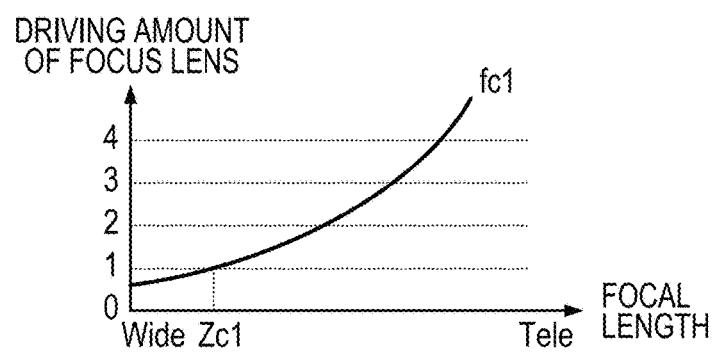

CONTROL APPARATUS, LENS APPARATUS, AND IMAGING APPARATUS

BACKGROUND OF THE INVENTION

Field of the Invention

The present invention relates to a control apparatus, a lens apparatus, and an imaging apparatus. The control apparatus performs control of a movable optical member of an optical apparatus.

Description of the Related Art

Systems for shooting with an image pickup system using TV cameras, videos, lenses, and the like have been proposed which enables sub-operator other than a main operator to correct image capture conditions. For example, Japanese Patent Application Laid-Open. No. 2005-159964 discloses an image pickup system in which independently operable optical systems for adjusting the focal length are provided on the object side and on the image pickup element side, respectively, and are operated by a main operator and a sub-operator operate, respectively, so that the focal length can be adjusted also by the sub-operator other than the main operator.

Also, Japanese Patent No. 4609685 discloses an image pickup system which drives the optical system to a focus position to which a target position of a focus position instructed by the main operator is shifted by a correction amount instructed by a sub-operator.

In addition, in the image pickup system disclosed in Japanese Patent No. 4609685, the shift by the correction amount is gradually reduced in response to a change of commands from the main operator.

However, the system disclosed in Japanese Patent Application Laid-Open No. 2005-159964 needs to have multiple independently operable optical systems, which makes the lens configuration complicated.

In the system disclosed in Japanese Patent No. 4609685, the correction amount of the sub-operator is gradually reduced in response to a change of commands from the main operator. As a result, the change amounts in image capture conditions relative to the operation amounts performed by the main operator vary between during and after the correction amount reduction, which causes a problem that the main operator may feel incongruous during operation.

If the image capture condition change amounts (operation sensitivity) relative to the operation amounts are the same between the main operator and a sub-operator, the following problem would occur.

The main operator sets image capture conditions for changing the composition of an image to be picked up, while the sub-operator performs correction operation to the composition of the picked-up image set by the main operator. Hence, the main operator operates over the entire change ranges of the image capture conditions, while the sub-operator needs to perform detailed operation in the narrower change ranges of the image capture conditions than those of the main operator.

Normally, an operation sensitivity is set suitable for the main operator to make it easy for the main operator to set the image capture conditions. However, if the sub-operator operates with the same operation sensitivity, the image capture conditions would change more than the change amount of the image capture conditions that the sub-operator expect. As a result, the sub-operator has a problem of difficulty in making fine corrections.

Thus, it is necessary to an operation sensitivity suitable for each of the main operator and the sub-operator. However, there is no description about changing the operation sensitivities of the main operator and the sub-operator in Japanese Patent No. 4609685.

SUMMARY OF THE INVENTION

A control apparatus of the present invention is a control apparatus which performs control of a movable optical member of an optical apparatus based on a first operation amount of a first operation device and a second operation amount of a second operation device, the apparatus comprising: a storage that stores information of a first operation sensitivity of the first operation device and a second operation sensitivity of the second operation device; and a processor configured to generate a target value for the control based on the first operation amount, the second operation amount, and the first operation sensitivity and the second operation sensitivity of which information is stored in the storage.

Further features of the present invention will become apparent from the following description of exemplary embodiments with reference to the attached drawings.

BRIEF DESCRIPTION OF THE DRAWINGS

FIG. 2 is a diagram for explaining operation unit information.

FIG. 3A1 is a diagram for explaining the relationship between operation unit and the operation amount, and the operation unit command value.

FIG. 3A2 is a diagram for explaining the relationship between operation unit and the operation amount, and the operation unit command value.

FIG. 3B1 is a diagram for explaining the relationship between the operation unit and the operation amount, and the operation unit command value.

FIG. 3B2 is a diagram for explaining the relationship between the operation unit and the operation amount, and the operation unit command value.

FIG. 7A is a diagram for explaining operation sensitivity.

FIG. 7B1 is a diagram for explaining an operation sensitivity.

FIG. 7B2 is a diagram for explaining an operation sensitivity.

FIG. 7C is a diagram for explaining an operation sensitivity.

DESCRIPTION OF THE EMBODIMENTS

Preferred embodiments of the present invention will now be described in detail in accordance with the accompanying drawings.

Embodiment 1

Hereinafter, a first embodiment of the present invention will be described using FIG. 1.

Figure 1:
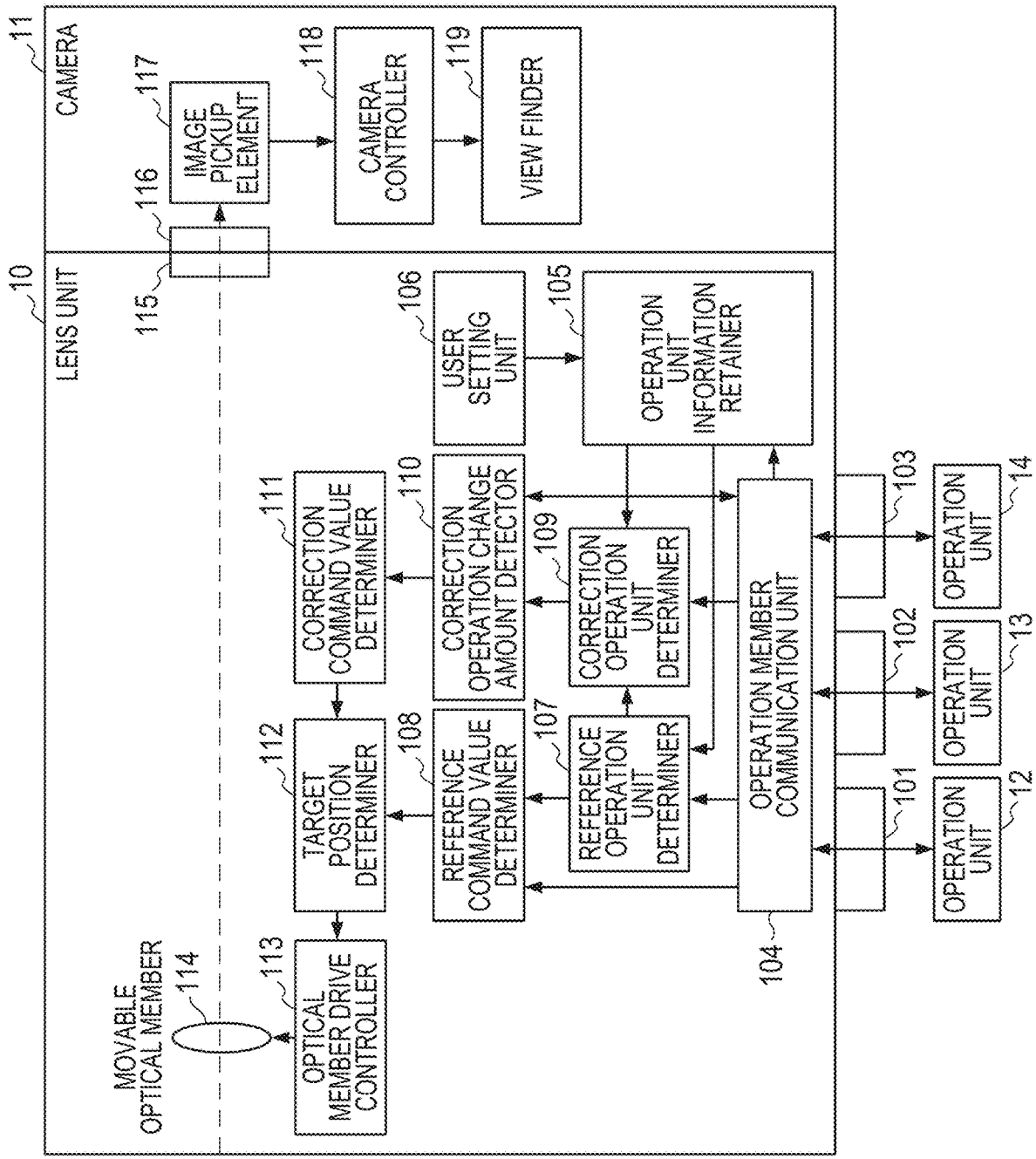
FIG. 1 is a configuration block diagram of Embodiment 1.

FIG. 1 is a configuration block diagram of an imaging apparatus (an image pickup apparatus) including a control apparatus (an image capture controlling apparatus) according to Embodiment 1 of the present invention. In FIG. 1, a lens unit (lens apparatus, optical apparatus) 10 is a lens unit for controlling a movable optical member associated with picking up images. A camera 11, which is a camera for picking up images, is connected to the lens unit 10 by unit of mounts 115 and 116 and constitutes the image pickup apparatus (optical apparatus) together with the lens unit.

Operation unit 12, 13, and 14 are operation unit for operating a movable optical member 114 and are connected to the lens unit 10 via connectors 101, 102, and 103, respectively. For example, the movable optical member 114 is a focus lens for adjusting focus, and the operation unit 12, 13, and 14 are rotary operation unit called focus knobs.

An operation unit communication unit 104 is a communication unit for communicating with the operation unit 12, 13, and 14.

An operation unit information retainer 105 for retaining operation unit information, which is information on the operation unit, includes, for example, a flash ROM memory and a processor of a CPU.

A user setting unit 106 is a user interface unit for inputting user settings and includes, for example, a display and switches.

A reference operation unit determiner 107 determines operation unit to be operated by the main operator from the operation unit 12, 13, and 14. A reference command value determiner 108 determines a reference command value which is a command value of the operation unit operated by the main operator. A correction operation unit determiner 109 determines operation unit to be operated by a sub-operator from the operation unit 12, 13, and 14. A correction operation change amount detector 110 detects a change amount of a correction command value which is a command value of the operation unit operated by the sub-operator.

A correction command value determiner 111 determines a correction command value which is a command value of the operation unit operated by the sub-operator. A target position determiner (command value determiner) 112 determines a target position (command value) for the movable optical member 114 from the reference command value and the correction command value.

The operation unit communication unit 104, the reference operation unit determiner 107, the reference command value determiner 108, the correction operation unit determiner 109, the correction operation change amount detector 110, the correction command value determiner 111, and the target position determiner 112 are, for example, included in a processor of a CPU.

An optical member drive controller 113 is a drive controller for electrically driving the movable optical member 114. The optical member drive controller 113 includes, for example, an encoder for detecting positions, a motor, and a motor driver circuit.

An image pickup element (an imaging element) 117 for picking up images (for receiving light via the movable optical member 114) includes, for example, a CCD. A camera controller 118 for controlling the camera 11 is included, for example, in a processor of a CPU. A view finder 119 for displaying the images captured by the camera includes, for example, a liquid crystal monitor.

Operation unit 12, 13, and 14 convert operation amounts operated by the operation unit into operation unit command values CTLdem1, CTLdem2, and CTLdem3 which are respective operation command values.

The converted operation unit command values CTLdem1, CTLdem2, and CTLdem3 are transmitted to the lens unit 10, and are received by the operation unit communication unit 104.

In addition, the operation unit command values CTLdem1, CTLdem2, and CTLdem3, together with operation unit type information which indicates the type of each operation unit, are transmitted from the operation unit 12, 13, and 14 to the lens unit 10, and are received by the operation unit communication unit 104.

When acquiring the operation unit type information, the operation unit communication unit 104 notifies the operation unit information retainer 105 of the operation unit type information. Meanwhile, operation unit setting information set by the user with the user setting unit 106 is communicated to the operation unit information retainer 105.

The operation unit type information and the operation unit setting information are managed as part of operation unit information at the operation unit information retainer 105. The operation unit information, the operation unit type information, and the operation unit setting information will be described later.

The operation unit information retainer 105 notifies the reference operation unit determiner 107 and the correction operation unit determiner 109 of the operation unit information.

The reference operation unit determiner 107 determines reference operation unit based on the operation unit information and not the reference command value determiner 108 and the correction operation unit determiner 109 of the determined reference operation unit. How to determine reference operation unit will be described later.

The reference command value determiner 108 acquires from the operation unit communication unit 104 the operation unit command value of the reference operation unit determined by the reference operation unit determiner 107 as a reference operation unit command value CTLddemB, determines the reference operation unit command value CTLddemB as a reference command value CTLb, and notifies the target position determiner 112 of the reference command value CTLb.

The correction operation unit determiner 109 determines correction operation unit based on the determined reference operation unit and the operation unit information, and notifies the correction operation change amount detector 110 of the determined correction operation unit. How to determine the correction operation unit will be described later.

The correction operation chance amount detector 110 determines a correction operation change amount. CTLchC from an operation unit command value CTLddemC of the correction operation unit determined the correction operation unit determiner 109, and notifies the correction command value determiner 111 of it. How to determine the correction operation change amount CTLchC will be described later.

The correction command value determiner 111 determines a correction command value CTLc based on the correction operation chance amount CTLchC, and notifies the target position determiner 112 of it. How to determine the correction command value CTLc will be described later.

The target position determiner 112 determines a target position CTLg, which is the final target position of the movable optical member from the reference command value CTLb and the correction command value CTLc, and notifies the optical member drive controller 113 of it. How to determine the target position CTLg will be described later.

Receiving the input of the target position CTLg, the optical member drive controller 113 drives the movable optical member 114 to the target position CTLg.

Meanwhile, the light having passed through the movable optical member 114 passes through the mounts 115 and 116, is received by the image pickup element 117, photoelectrically converted, and outputted to the camera controller 118 as an image electrical signal.

The camera controller 118 converts the image electrical signal into a video signal, and outputs it to the view finder 119. The view finder 119 displays the video signal outputted from the camera controller 118 on the view finder.

With the above configuration, it is possible to operate the movable optical member 114 by operation of the main operator, and also possible to drive the movable optical member 114 according to the amount of change operated by the sub-operator.

Accordingly, when the main operator and sub-operator operate respective operation unit, images are picked up in the image capture conditions intended by the main operator and the sub-operator, and displayed on the view finder.

Next, the operation unit information, the operation unit type information, and the operation unit setting information will be described using FIG. 2.

The operation unit information, the operation unit type information, and the operation unit setting information are managed at the operation unit information retainer 105.

FIG. 2 illustrates items and values of the operation unit information, the operation unit type information, the operation unit setting information, and operation unit connection interface information. Here, the operation unit information 1, 2, and 3 serves as information sets associated with the connectors 101, 102, and 103, respectively. Hence, they are pieces of information also associated with the operation unit 12, 13, and 14 connected to the respective connectors.

As illustrated in FIG. 2, each set of the operation unit information 1, 2, and 3 includes the same items, the operation unit type information, the operation unit setting information, and the operation unit connection interface information.

The operation unit type information is information indicating the type of operation unit. The operation unit setting information is information on operation unit set by the user with the user setting unit 106.

The operation unit connection interface information is information on interfaces dependent on the connectors 101, 102, and 103, and is a predetermined value stored in ROM data of a CPU.

Next, each item will be described. As for the operation range limit, information of "yes" or "no" on whether a limit exist in the operation range of the operation unit of operation unit is communicated from the operation unit as the operation unit type information. "Yes" or "no" on the limitation in the operation range of operation unit will be described using FIGS. 3A1, 3A2, 3B1, and 3B2.

FIG. 3A1 illustrates a diagram of operation unit that has a limit in the operation range in the case where the movable optical member 114 is a focus lens. The operation unit illustrated in FIG. 3A1 has a base 301 and a movable operation unit 302 attached thereon, which is rotatable counterclockwise (in the direction indicated by arrow A) and clockwise (in the direction indicated by arrow B), as viewed on the drawing. MC1 and M1 are marks inscribed on the base 301 and the movable operation unit 302, respectively. FIG. 3B1 illustrates the relationship between an operation amount of the operation unit illustrated in FIG. 3A1 and the operation unit command value. The horizontal axis represents the operation unit command value, and the vertical axis represents the operation amount of the movable operation unit 302.

The operation unit illustrated in FIG. 3A1 is adjusted such that when MC1 and M1 are coincident with each other, an operation unit command value F1 is transmitted to the lens unit 10. Here, when the lens unit 10 receives the operation unit command value F1, the position of the focus lens is controlled to be at a specified position. In addition, when M1 is located at MN1 which is a position having a specified rotation angle from Mc1 in direction A, an operation unit command value that positions the focus lens at the closest end position is transmitted to the lens unit 10. When M1 is located at M11 which is a position having a specified rotation angle from MC1 in direction of B, an operation unit command value that positions the focus lens at the infinite end position is transmitted to the lens unit 10. The movable range of the movable operation unit 302 is limited by a mechanical mechanism such that M1 is movable only in the range between MN1 and M11.

FIG. 3A2 illustrates a diagram of operation unit that has no limit in the operation range in the case where the movable optical member 114 is a focus lens. The operation unit illustrated in FIG. 3A2 has a base 311 and a movable operation unit 312 attached thereon, which is rotatable counterclockwise (in the direction indicated by arrow A) and clockwise (in the direction indicated by arrow B), as viewed on the drawing. M2 is a mark inscribed on the movable operation unit 312, and MS2 can be at any position of the base 311. MS2 indicates the position where MS2 was located when the operation unit was connected to the lens unit 10, or when the lens unit 10 required an initialization. FIG. 3B2 illustrates the relationship between an operation amount of the operation unit illustrated in FIG. 3A2 and the operation unit command value. The horizontal axis represents the operation unit command value, and the vertical axis represents the operation amount of the movable operation unit 312.

The operation unit illustrated in FIG. 3A2 acquires F2, which is an operation unit command value corresponding to the current position of the focus lens, from the lens unit 10 at the startup. In addition, a setting may be made such that an arbitrary operation unit command value F2 is transmitted when M2 is at a specific position of MS2 in response to an initialization request from the lens unit 10. An adjustment is made such that the operation unit command value F2 is transmitted to the lens unit 10 when M2 of the movable operation unit 312 is coincident with MS2. Moreover, when M2 is at the position of MN2 having a specified rotation angle from MS2 in direction A, the operation unit command value that positions the focus lens at the closest end position is transmitted to the lens unit 10.

When M2 is at the position of M12 having a specified rotation angle from MS2 in direction B, the operation unit command value that positions the focus lens at the infinite end position is transmitted to the lens unit 10. Since the movable operation unit 302 has no limit in the movable range, even when M2 is rotated beyond MN2 in direction A, the operation unit command value that positions the focus lens at the closest end position is transmitted to the lens unit 10. Similarly, even when M2 is rotated beyond M12 in direction B, the operation unit command value that positions the focus lens at the infinite end position is transmitted to the lens unit 10.

As described above, in the operation unit illustrated in FIG. 3A1, an operation unit command value is uniquely determined depending on the positional relationship between MC1 and M1.

However, in the operation unit illustrated in FIG. 3A2, it is possible to adjust the operation unit command value such that when M2 is coincident with MS2, the operation unit command value is one that positions the focus lens at the position where the focus lens was when the operation unit was connected to the lens unit 10. Hence, for the operation unit illustrated in FIG. 3A2, the focus lens will not move by the operation unit command value when the operation unit is connected to the lens unit 10. Moreover, in the operation unit illustrated in FIG. 3A2, MS2 can be assigned to any operation unit command value in response to an initialization request from the lens unit 10. Thus, the lens unit 10 can judge easily the change amount of the operation unit command value performing the initialization request.

The operation range limit is identified as "yes" for the operation unit illustrated in FIG. 3A1, and the operation range limit is identified as "no" for the operation unit illustrated in FIG. 3A2, as described above.

This embodiment shows an example in which the operation unit 12 is operation unit with an operation range limit, and the operation unit 13 and the operation unit 14 are operation unit with no operation range limit. Accordingly, the values of the operation range limit item of the operation unit information 1, 2, and 3 are the ones shown in FIG. 2.

As for the operation type, a value set by the user, indicating whether operation unit connected to the connector is "basic operation unit" or "correction operation unit", is retained.

This embodiment shows an example in which a setting is made such that the operation unit connected to the connector 101 is reference operation unit, and the operations unit connected to the connectors 102 and 103 are correction operation unit. Accordingly, the values of the operation type item of the operation unit information 1, 2, and 3 are the ones shown in FIG. 2. The operation sensitivity is information defining the relationship between the operation amount of operation unit and the movement amount of the movable optical member 114, and corresponds to a gain in control. This embodiment shows an example in which the operation sensitivity of the operation unit connected to the connector 101 is set as sensitivity mode 1. In this example, the operation sensitivity of the operation unit connected to the connector 102 is set as sensitivity mode 2.

In this example, the operation sensitivity of the operation unit connected to the connector 103 is set as sensitivity mode 3. Accordingly, the values of the operation sensitivity item of the operation unit information 1, 2, and 3 are the ones shown in FIG. 2. The operation sensitivity and each sensitivity mode will be described later.

The IF physical position is information indicating where the connectors 101, 102, and 103 are physically located.

This embodiment shows an example in which the connector 101 is arranged on the object side of the lens unit 10, the connector 103 on the camera 11 side of the lens unit, and the connector 102 between the connector 101 and the connector 103. Accordingly, the values of the IF physical position of the operation unit information 1, 2, and 3 are the ones shown in FIG. 2.

Figure 4:
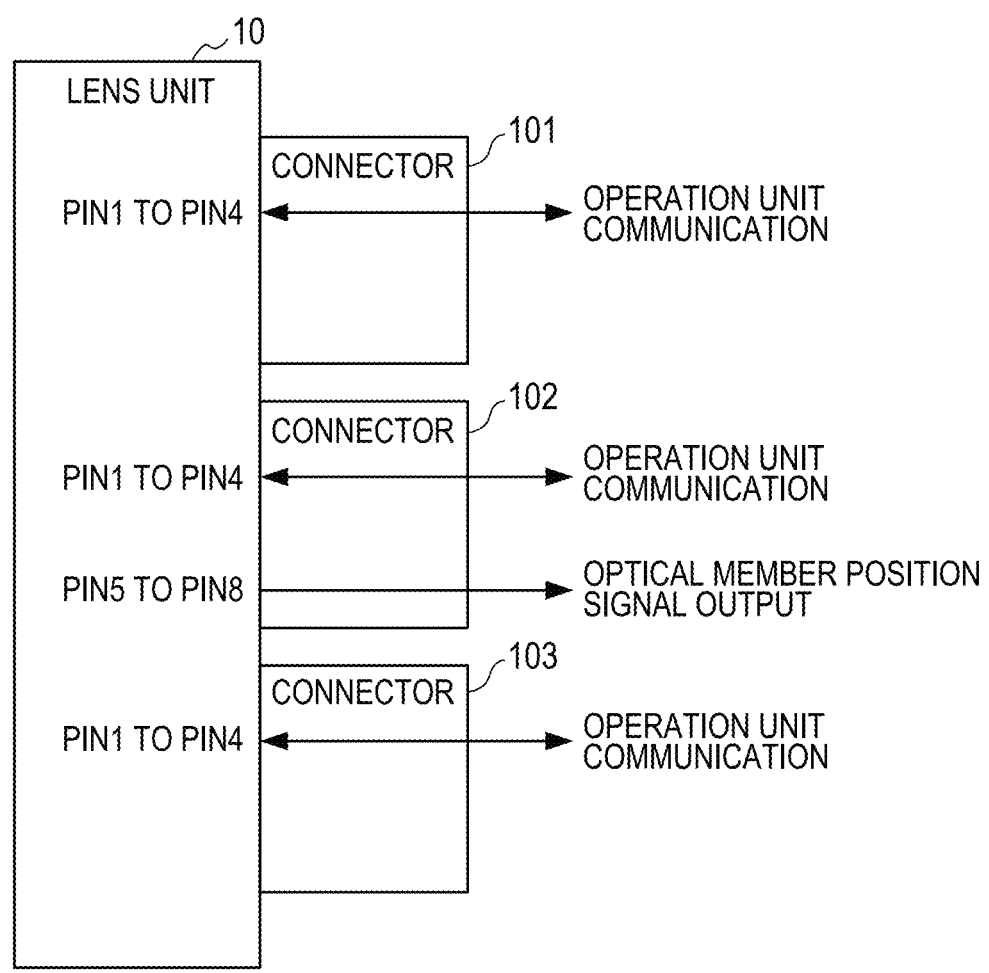
FIG. 4 is a diagram for explaining functions of connectors.

The IF function is information indicating what functions are assigned to the connectors 101, 102, and 103. FIG. 4 is a diagram illustrating what functions are assigned to the contact pins included in the connectors 101, 102, and 103.

For all connectors, a function for communicating with the operation unit is assigned to PIN1 to PIN4, and only for the connector 102, a signal output function for indicating the position of the optical member is assigned to PIN5 to PIN8.

The signal indicating the position of the optical member is, for example, an analog signal in which the relationship between the position of the optical member and the voltage is unique, or a signal in which pulse signals change depending on the positional change of the optical member. Accordingly, the values of the IF function of the operation unit information 1, 2, and 3 are the ones shown in FIG. 2.

With the above configuration, the information for determining the reference operation unit and the correction operation unit are managed. How to utilize each item of the operation unit information will be described later.

Next, how to determine the reference operation mean using each item of the operation unit information will be described below using FIG. 2.

When acquiring operation unit information from the operation unit information retainer 105, the reference operation unit determiner 107 determines, according to predetermined conditions, reference operation unit out of the operation unit that are transmitting valid operation unit commands to the movable optical member 114. Which item of the operation unit information is used to determine the reference operation unit is determined in advance for each product.

Hereinafter, how to determine the reference operation unit will be described for each item.

In the case where the reference operation unit is determined based on the operation range limit item, the operation unit connected to a connector associated with operation unit information in which the value of the operation range limit item is "yes" is determined as the reference operation unit. In this embodiment, since the value of the operation range limit item in the operation unit information 1 is "yes", the operation unit 12 associated with the operation unit information 1 is determined as the reference operation unit.

In the case where the reference operation unit is determined based on the operation type item, the operation unit connected to a connector associated with operation unit information in which the value of the operation type item is "basic operation" is determined as the reference operation unit.

In this embodiment, since the value of the operation type item in the operation unit information 1 is "basic operation", the operation unit 12 associated with the operation unit information 1 is determined as the reference operation unit.

In the case where the reference operation unit is determined based on the IF physical position item, the operation unit connected to a connector associated with operation unit information in which the value of the IF physical position item is "object side" is determined as the reference operation unit. Here, the connector, the value of the IF physical position item of which is "object side", unit that the connector is arranged physically closest to the object of the lens unit. In this embodiment, the connector 101 is arranged on the object side, the connector 103 on the camera side, and the connector 102 between the connector 101 and the connector 103.

In general, it is likely that an operator on the object side performs basic operation, and an operator close to the viewer of the camera performs correction operation. Hence, since it can be judged that operation unit connected to a connector, the value of the IF physical position item of which is "object side" is operated by the main operator, the operation unit associated with the operation unit information, the value of the IF physical position item of which is "object side", is determined as the reference operation unit.

In this embodiment, since the value of the IF physical position item of the operation unit information 1 is "object side", the operation unit 12 associated with the operation unit information 1 is determined as the reference operation unit.

In the case where the reference operation unit is determined based on the IF function item, the operation unit associated with operation unit information in which the value of the IF function item does not include a special function is determined as the reference operation unit. This is for utilizing a special function by disconnecting the correction operation unit from the connector in the case where the special function is prioritized over auxiliary correction operation depending on the shooting situation.

In this embodiment, since the value of the IF function item of the operation unit information 2 includes "optical member position signal output", operation unit other than the operation unit 13 associated with the operation unit information 2 is determined as the reference operation unit.

In this embodiment, the operation unit 12 and the operation unit 14 are candidates for reference operation unit, and in this case, the reference operation unit is determined according to other items having a high priority. For example, in the case where the operation type item has a high priority, since the value of the operation type of the operation unit information 1 is "basic operation", the operation unit 12 associated with the operation unit information 1 is determined as the reference operation unit.

With the above configuration, it is possible to automatically determine operation unit, which is the most suitable for reference operation unit, as the reference operation unit.

Although, in this embodiment, items on which the reference operation unit is determined are determined based on items determined in advance for each product, a method of letting the user designate it through the user setting unit 106 may be used. Alternatively, a priority is set on each item, and the reference operation unit may be determined based on an item having a high priority.

Next, how to determine correction operation unit will be described below.

The correction operation unit determiner 109 determines the correction operation unit based on information on the reference operation unit acquired from the reference operation unit determiner 107. Specifically, the correction operation unit are determined out of the operation unit other than the reference operation unit determined by the reference command value determiner 108, among the operation unit transmitting valid operation unit commands to the movable optical member 114.

For example, descriptions will be provided for the case where the correction operation unit are determined according to the operation type item in the operation unit information, in the case where the reference operation unit determiner 107 has determined the operation unit 12 as the reference operation unit.

Since both values of the operation type item of the operation unit information 2 and are "correction operation" as illustrated in FIG. 2, the operation unit 13 and the operation unit 14 associated with the operation unit information 2 and are determined as the correction operation unit.

Although descriptions are provided in this embodiment taking an example in the case where the operation unit 13 and the operation unit 14 are determined as the correction operation unit, only single operation unit may be determined.

With this configuration, it is possible to automatically determine optimum correction operation unit out of operation unit other than the reference operation unit.

Figure 5:
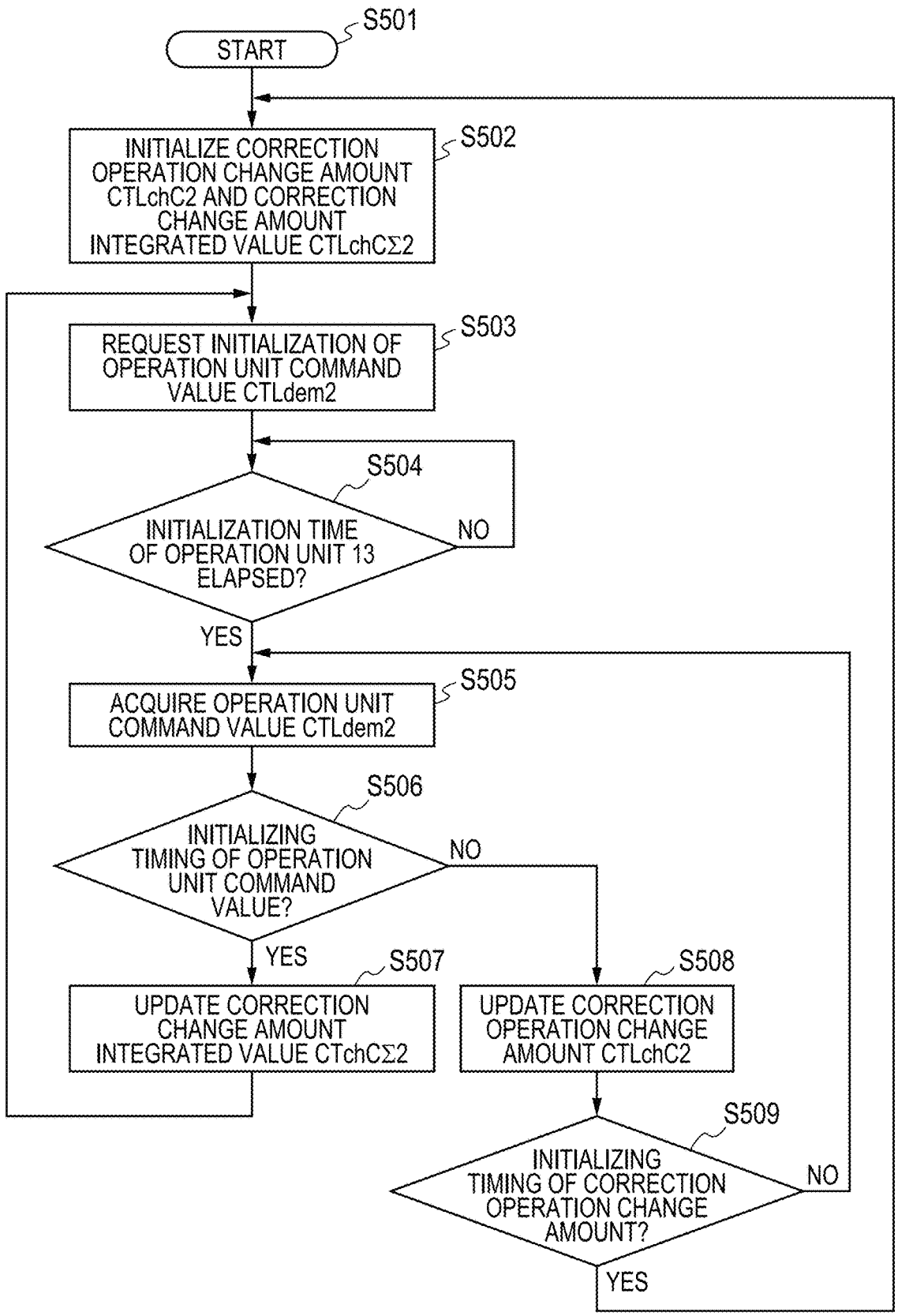
FIG. 5 is a flowchart for determining a correction operation change amount CTLchC.

Next, how to determine the correction operation change amount CTLchC will be described below using FIG. 5. FIG. 5 illustrate a flowchart for determining the correction operation change amount CTLchC. Processing to determine the correction operation change amount CTLchC is executed at the correction operation change amount detector 110. In the following explanation, how to determine the correction operation change amount CTLchC2 will be described in the case where the operation unit 13 has been determined as the correction operation unit.

Processing is started at S501, and proceeds to S502.

At S502, the correction operation change amount CTLchC2 and a correction change amount integrated value CTLchCΣ2 are initialized to 0, and the processing proceeds to S503. The correction change amount integrated value CTLchCΣ2 is a value to retain an integrated value of the change amount of the operation unit command value CTLdem2.

At S503, an initialization unit (not illustrated) requests the operation unit 13 via the operation unit communication unit 104 to initialize the operation unit command value CTLdem2 to an operation unit command value initial value (reference value) CTLdem2Ini, and the processing proceeds to S504.

Here, it is desirable that the operation unit command value value CTLdem2Ini be at the center value in the range of the values that the operation unit command value CTLdem2 can take so that change amounts of the operation unit command value CTLdem2 with reference to the operation unit command value initial value CTLdem2Ini can be maximum in both increasing and decreasing directions.

At S504, it is checked if the time that it takes for the operation unit communication unit 104 to receive the operation unit command value CTLdem2 updated at S503 has passed. If the time has passed, the processing proceeds to S505. Here, the time to wait at S504 is set to a predetermined time in advance.

At S505, the operation unit command value CTLdem2 is acquired from the operation unit communication unit 104, and the processing proceeds to S506.

At S506, the initialization unit (not illustrated) judges whether it is a timing for initializing the operation unit command value CTLdem2. If it is an initializing timing, the processing proceeds to S507, and if not, the processing proceeds to S508. The reason for initializing the operation unit command value CTLdem2 here is to detect a chance in the operation command value even when operation is performed beyond the possible range of the values that the operation unit command value CTLdem2 can take. For example, when the operation unit command value CTLdem2 reaches the maximum value, even, if the operation unit is moved in the increasing direction, the operation unit command value CTLdem2 is fixed at the maximum value and a change of the operation command value cannot be detected. In addition, similarly, also when the operation unit command value CTLdem2 is the minimum value, and the operation unit is operated in the decreasing direction, a change of the operation command value cannot be detected. To prevent this problem, the operation unit command value CTLdem2 is initialized as necessary. The timing for initializing the operation unit command value CTLdem2 is, for example, the time when the operation unit command value CTLdem2 has not changed for a certain period, or when the correction operation change amount CTLchC exceeds a specified value.

At S507, the correction change amount integrated value CTLchCΣ2 is updated to the value indicated by the following expression (1), and the processing proceeds to S502.

$$CTLchC\Sigma 2+(CTLdem2-CTLdem2Ini) \quad (1)$$

At S508, the correction operation change amount CTLchC is updated with the following expression (2), and the processing proceeds to S509.

$$CTLchC=CTLchC\Sigma 2+(CTLdem2-CTLdem2Ini) \quad (2)$$

At S509, it is judged if it is a timing for initializing the correction operation change amount CTLchC. If it is an initializing timing, the processing proceeds to S502, and if not, the processing proceeds to S505. The initializing timing for the correction operation change amount CTLchC will be described later.

With the above method, the correction operation change amount CTLchC2 of the operation unit 13 is determined. The correction operation change amount CTLchC3 of the operation unit 14 can be determined in the same way.

With the above method, it is possible to avoid the problem that operation by the sub-operator is not detected on the lens unit 10 side because the operation unit command value CTLdem becomes out of the range of the operation unit command value.

In addition, by clearing the correction operation change amount CTLchC at a timing that is judged not to affect images to be picked up, it is possible to avoid the problem that the operation range of the main operator is limited by the correction command value CTLc.

In this embodiment, when it is judged at S509 that it is a timing for initializing the correction operation change amount CTLchC, the correction operation change amount CTLchC2 is immediately initialized at S502. However, the correction operation change amount CTLchC, may be decreased gradually, according to the value of the correction operation change amount CTLchC. By gradually decreasing the correction operation change amount CTLchC at a timing for initializing the correction operation change amount CTLchC, a sudden change in images being picked up is prevented and the initialization of the correction operation change amount CTLchC2 is completed without any change in the reference operation command after a specified time has passed. Thus, it is possible to create in an early stage, the state where a sense of incongruity in the operation of the reference correction command in the process of reducing the correction operation change amount CTLchC does not occur, while preventing a sudden change in images.

In the case where the correction operation change amount CTLchC is gradually decreased, the processing in FIG. 5 is temporarily stopped, and the correction operation change amount CTLchC is decreased. When the correction operation change amount CTLchC turns to 0, the processing in FIG. 5 is started from S501.

Figure 6:
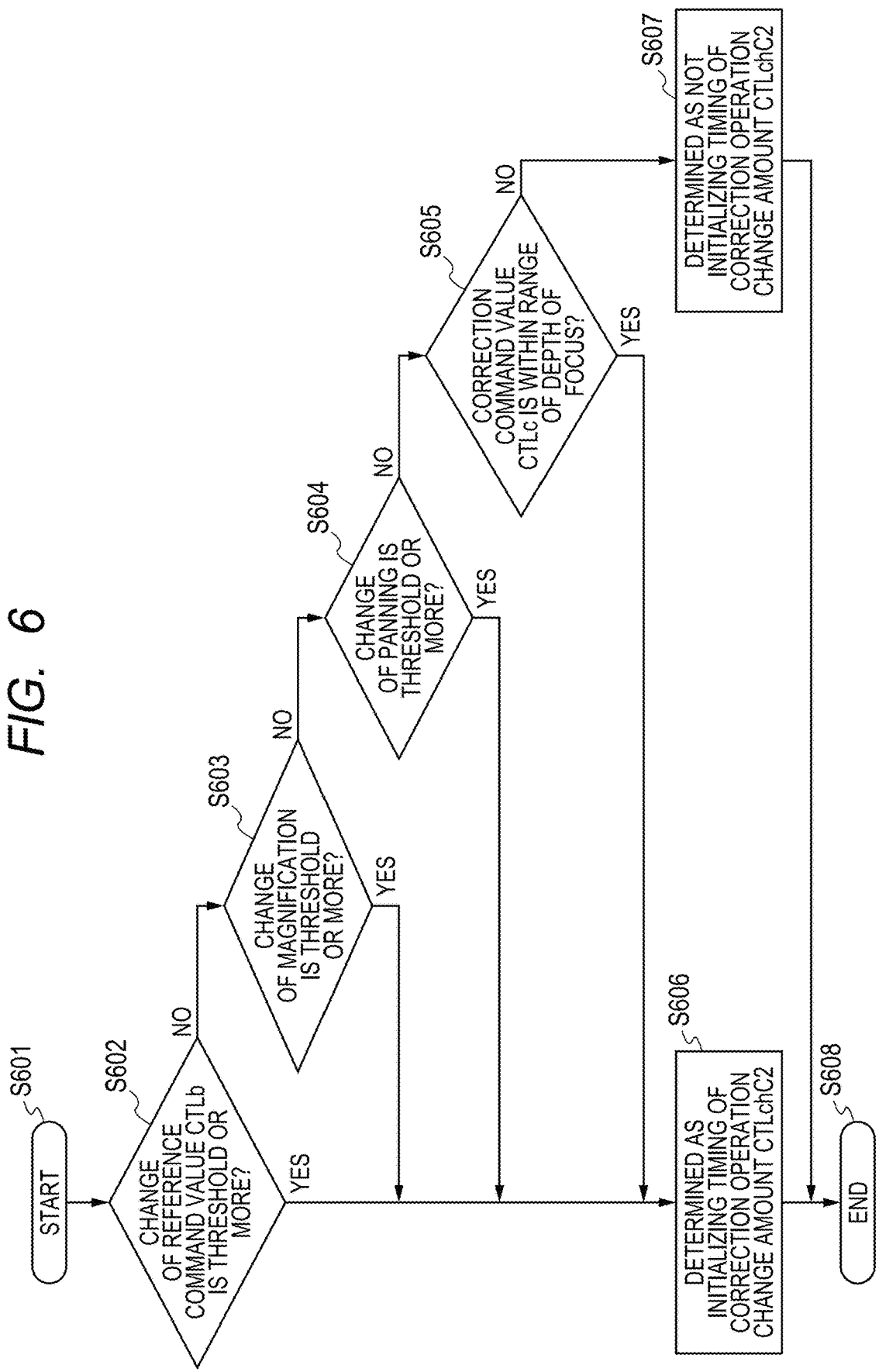
FIG. 6 is a flowchart for determining the initializing timing of the correction operation change amount CTLchC.

Next, the initializing timing for the correction operation change amount CTLchC will be described with reference to FIG. 6 illustrating a flowchart for determining the initializing timing. The processing of determining the timing for initializing the correction operation change amount CTLchC is executed at the correction operation change amount detector 110. The processing is started at S601, and proceeds to S602.

At S602, it is judged whether the change amount per unit time of the reference command value CTLb is larger than or equal to a specified threshold. In addition, it is judged whether a change from the reference command value CTLb when the correction operation change amount CTLchC2 was initialized at S502 in FIG. 5, to the current reference command value CTLb is larger than or equal to a specified threshold. As for the specified thresholds, thresholds from which it is judged that the shooting target is changed are stored in advance in the lens unit 10. When it is judged at S602 that the change of the reference command value CTLb is larger than or equal to the threshold, the processing proceeds to S606, and if not, proceeds to S603.

At S603, it is judged whether the change amount per unit time of the shooting magnification is larger than or equal to a specific threshold. In addition, it is judged whether a change from the shooting magnification when the correction operation change amount CTLchC2 was initialized at S502 in FIG. 5, to the current shooting magnification is larger than or equal to a specified threshold. As for the specified threshold, a threshold from which it is judged that the shooting target is changed is stored in advance in the lens unit 10. If it is judged at S603 that the change of the shooting magnification is larger than or equal to the threshold, the processing proceeds to S606, and if not, proceeds to S604.

At S604, when it is judged from an acceleration sensor or each speed sensor and a panning detector (not illustrated) in the lens unit 10 that the movement amount per unit time of the lens unit 10 is larger than or equal to a specified threshold, the panning change is judged to be larger than or equal to the threshold. As for the specified threshold, a threshold from which it is judged that the shooting target is changed is stored in advance in the lens unit 10. If it is judged at S604 that the panning change is larger than or equal to the threshold, the processing proceeds to S606, and if not, proceeds to S605.

At S605, when the focus correction amount by the correction command value CTLc is within a depth of focus calculated by the focus depth calculator (not illustrated) in the lens unit 10, it can be judged that initializing the correction command value CTLc will not affect images to be picked up. Accordingly, if it is judged that the focus correction amount by the correction command value CTLc is within the depth of focus, the processing proceeds to S606, and if not, proceeds to S607.

At S606, it is judged that it is a timing for initializing the correction operation change amount CTLchC, and the processing proceeds to S608, and is terminated.

At S607, it is judged that it is not a timing for initializing the correction operation change amount CTLchC, the processing proceeds to S608, and is terminated.

Through the processing above, based on a change of the reference command value, a change of the shooting state such as the shooting magnification or panning and tilting operation, and a change of the correction command value, it is possible to judge the timing for initializing the correction operation change amount CTLchC. Thus, the correction operation change amount CTLchC2 can be initialized at a timing that can be judged at S509 in the flowchart of FIG. 5 not to affect images to be picked up.

Next, the operation sensitivity and the sensitivity mode will be described below.

FIG. 7A illustrates the relationship between the correction operation change amount CTLchC2 and correction command value CTLc2 of the operation unit 12 in the case where the movable optical member 114 is a focus lens for adjusting the focus. The horizontal axis represents values of the correction operation change amount CTLchC2, and the vertical axis represents the correction command value CTLc2. In FIG. 7A, the + direction indicates the infinity side, and the − direction indicates closest side. Here, the relationship between the correction operation change amount CTLchC2, the correction command value CTLc2, and the operation sensitivity G is indicated by the following expression (3).

$$CTLc2 = CTLchC2 \times G \quad (3)$$

For example, in the case where G is 1 in the sensitivity mode 1, G is ½ in the sensitivity mode 2, and G is ¼ in the sensitivity mode 3, even when the operation unit is operated by the same rotation angle, the correction command value CTLc2 in sensitivity mode 2 is ½ of that in sensitivity mode 1, and that in sensitivity mode 3 is ¼ of that in sensitivity mode 1. Hence, the smaller the value of G is, the smaller value the correct on command value CTLc2 can be made to the rotation angle of the operation unit. Accordingly, the smaller the value of G is, the more precise focus lens operation can be performed.

Here, in the case where the reference operation unit command value CTLddemB is determined as the reference command value CTLb without any change, it can be judged that the change amount of the reference command value CTLb to the change amount of the reference operation unit command value CTLddemB is 1 to 1. Hence, it can be judged that the operation sensitivity G of the reference operation unit command value CTLddemB is 1.

Since the correction operation requires more precise operation than the reference operation, it is desirable that the operation sensitivity (correction gain) applied when the correction command value CTLc2 is calculated be a smaller value than the operation sensitivity (reference gain) G used when the reference command value CTLb is determined.

Alternatively, the operation sensitivity G may be changed based on the image capture condition. Here, Fmvb is defined as a focus lens driving amount from the in-focus position to the position where out-of-focus starts to occur.

FIG. 7B1 illustrates the relationship between CTLchC2b1, which is the correction operation change amount CTLchC2 necessary to drive the focus lens by the movement amount Fmvb, and the depth of focus, when the operation sensitivity F is constant. The horizontal axis represents the depth of focus, and the vertical axis represents values of the operation sensitivity G and the correction operation change amount CTLchC2. The upward direction of the vertical axis represents the increases of the value of the operation sensitivity G and the correction operation change amount CTLchC2. Gb1 indicates changes of the operation sensitivity G to changes of the depth of field, and in the case of FIG. 7B1, the operation sensitivity G is a constant value to the change of the depth of field. On the other hand, the correction operation change amount CTLchC2b1 increases as the depth of field becomes larger, and decreases as the depth of focus becomes smaller. This also indicates that when the depth of field is large, the operation rotation angle of the operation unit 12 is large, and that when the depth of focus is small, the operation rotation angle of the operation unit is small. Thus, in the case where the operation sensitivity G is constant to the change of the depth of field, when the same focus movement amount is operated, the operation rotation angle of the operation unit 12 will change according to the change of the depth of field.

In contrast, FIG. 7B2 illustrates the case where the operation sensitivity G is adjusted such that the operation rotation angle of the operation unit 12 is constant even in the case of operating the same focus movement amount (the movement amount from the in-focus position to the position where out-of-focus starts to occur). As in FIG. 7B1, the horizontal axis represents the depth of focus, and the vertical axis represents values of the operation sensitivity G and the correction operation change amount CTLchC2. The upward direction of the vertical axis represents the increases of the value of the operation sensitivity G and the correction operation change amount CTLchC2. Gb2 indicates values of the operation sensitivity G to changes of the depth of field, and the CTLchC2b1 indicates the relationship between the correction operation change amount CTLchC2 necessary to drive the focus lens by the movement amount Fmvb and the depth of focus. In FIG. 7B2, since the operation sensitivity G is adjusted such that CTLchC2b1 is a constant value, the operation rotation angle of the operation unit 12 is also a constant operation amount, being independent of changes in the depth of focus. Hence, as GB2 in FIG. 7B2 indicates, by changing the operation sensitivity G according to the change of the depth of field, it is possible to keep constant the operation rotation angle of the operation unit 12 necessary to drive a specific focus movement amount, being independent of the change of the depth of field.

The operation sensitivity G may be changed according to the resolution of the focus lens driving. FIG. 7C illustrates the relationship between the focus lens driving amount fc1 necessary to make a change of a specific object distance Fc1 and the focal length, in a lens in a rear focus lens configuration. The horizontal axis represents the focal length, and the vertical axis represents the focus lens driving amount. One scale of the focus lens driving amount indicates a minimum driving amount of the focus lens.

As illustrated in FIG. 7C, the focus lens driving amount necessary to make a change of specific object distance Fc1 is small on the wide-angle side and large on the telephoto side. In addition, when the focal length is on the wide-angle side of Zc1, the focus lens driving amount is smaller than or equal to the minimum driving amount. Hence, even though the operation rotation angle of the operation unit 12 is operated to make a change of the object distance Fc1, the focus lens will not be driven. In this respect, the operation sensitivity G may be changed so that the driving of the focus lens always occurs when the operation rotation angle of the operation unit 12 is operated by a certain angle. Specifically, in the case where the focal length is on the wide-angle side of Zc1, when the correction operation change amount CTLchC2 that makes a change of the object distance Fc1 or more occurs, the operation sensitivity G is changed such that the focus lens driving amount is 1 or more.

With the above method, it is possible to always drive the focus lens when the operation unit 12 is operated by a specified operation rotation angle.

As described in the above embodiment, by setting the operation sensitivity of the correction operation unit to the optimal value depending on the operation purpose of the sub-operator, it is possible to operate under the image capture condition expected by the sub-operator.

Next, how to determine the correction command value CTLc will be described below.

The processing to determine the correction command value CTLc is executed at the correction command value determiner 111.

The correction command value CTLc2 can be calculated using expression (3). The correction command value CTLc3 can be calculated in the similar way. The correction command value CTLc can be calculated from the correction command value CTLc2 and the correction command value CTLc3 using the following expression (4).

$$CTLc = CTLc2 + CTLc3 \quad (4)$$

With the above method, operations by multiple sub-operators can be applied at the same time as a correction command value.

Next, how to determine the target position CTLg will be described below. The processing to determine the target position CTLg is executed at the target position determiner 112. The target position CTLg can be calculated from the reference command value CTLb and the correction command value CTLc using the following expression (5).

$$CTLg = CTLb + CTLc \quad (5)$$

With the above method, it is possible to drive the movable optical member 114 at the same time from operations by a main operator and one or more sub-operators and set the image capture condition.

Descriptions will be provided for changes on the time axis of the target position CTLg, the reference command value CTLb, the correction command value CTLc, the correction operation change amount CTLchC, the correction change amount integrated value CTLchCΣ, reference operation unit command value CTLddemB and the correction operation command value CTLddemC in Embodiment 1.

The following descriptions are for the case where only the operation unit command value CTLdem2 is determined as correction operation unit.

In addition, the following descriptions are for the case where the reference operation unit command value CTLddemB agrees with the reference command value CTLb, and the operation sensitivity G of the correction operation command value CTLddemC is ½.

Figure 8A:
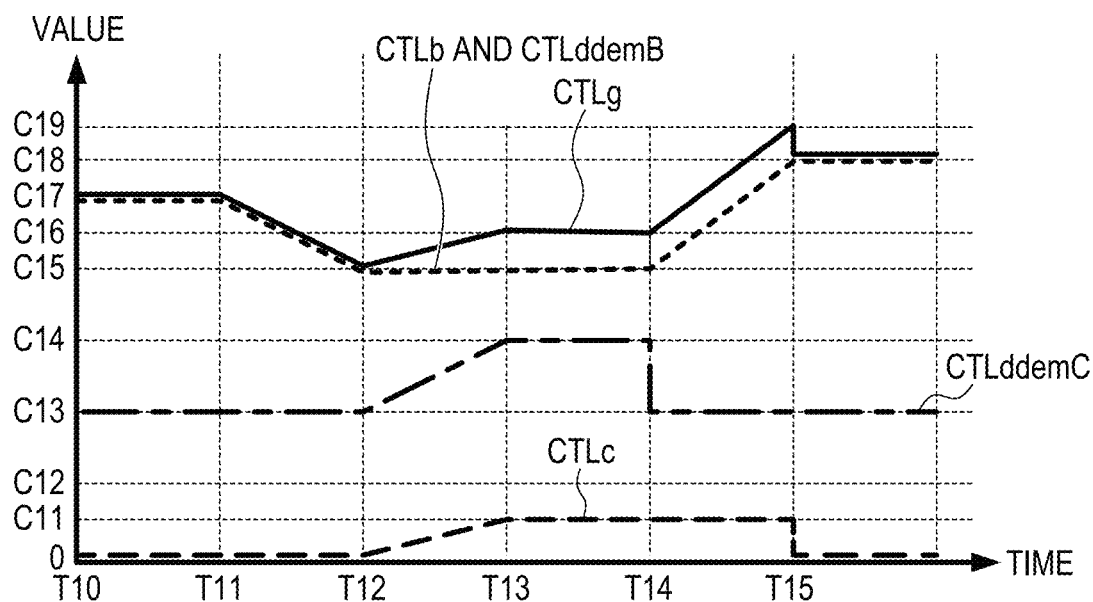
FIG. 8A is a diagram for explaining changes of each value in Embodiment 1.
Figure 8B:
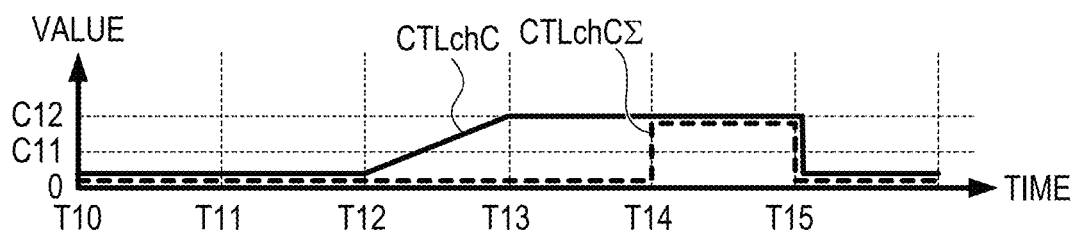
FIG. 8B is a diagram for explaining changes of each value in Embodiment 1.

FIG. 8A illustrates changes on the time axis of the target position CTLg, the reference command value CTLb and reference operation unit command value CTLddemB, the correction command value CTLc, and the correction operation command value CTLddemC. FIG. 8B illustrates changes on the time axis of the correction operation change amount CTLchC, and the correction change amount integrated value CTLchCΣ. The vertical axes of FIGS. 8A and 8B represents the target position, the command values, and the change amounts, and the horizontal axes represent a lapse of time. In FIGS. 8A and 8B, the values of the same symbols on the vertical axes are the same, and the same symbols on the horizontal axes indicate the same times.

At time T10, the respective values when the processing from S501 to S505 in FIG. 5 is completed are indicated.

At T10, the correction change amount integrated value CTLchCΣ and the correction operation change amount CTLchC have been initialized to 0 s in the processing at S502 in FIG. 5. The correction operation command value CTLddemC has been initialized in the processing at S503 in FIG. 5 to the value of C13 which is the operation unit command value initial value (reference value). In addition, the correction command value CTLc is 0 as indicated by expression (3) because the value of the correction operation change amount CTLchC is 0. Meanwhile, suppose that the reference operation unit command value CTLddemB is C17 at time T10. Accordingly, the reference command value CTLb is also C17. Hence, the target position CTLg is C17 as indicated by expression (5) because the value of the reference command value CTLb is C17, and the correction command value CTLc is 0.

During the time from T11 to T12, when the reference operation unit command value CTLddemB is changed from C17 to C15 by operation of the main operator, the reference command value CTLb also changes from C17 to C15. On the other hand, the correction operation command value CTLddemC is not changed, and remains at C13. Here, because the processing at S507 in FIG. 5 has not been executed since T10, the correction change amount integrated value CTLchCΣ remains at 0. Likewise, the value of the correction operation change amount CTLchC is also at 0 as indicated in expression (2). The correction command value CTLc is also at 0 as indicated in expression (3). Accordingly, the target position CTLg changes from C17 to C15 as indicated in expression (5).

When the correction operation command value CTLddemC is changed from C13 to C14 by operation of the sub-operator during the time from T12 to T13, the correction operation change amount CTLchC turns to C12 as indicated by expression (2). Here, because the processing at S507 in FIG. 5 has not been executed since T10, the correction change amount integrated value CTLchCΣ remains at 0. According the correction command value CTLc turns to C11, which is half the value of C12, as indicated in expression (3) because the operation sensitivity G is ½. On the other hand, since the reference operation unit command value CTLddemB is not changed, the reference operation unit command value CTLddemB and reference command value CTLb remain at C15. Hence, the target position CTLg changes from C15 to C16 as in expression (5). Here, the value changed from C15 to C16 is the same as the value changed from 0 to C11.

During the time from T13 to T14, since there is no change in the reference operation unit command value CTLddemB and the correction operation command value CTLddemC, each value is not changed from at T13. In addition, there is no change in the correction operation command value CTLddemC during the time lapse from T13 to T14, it is judged at S506 in FIG. 5 that it is a timing for initializing the correction operation command value CTLddemC. Accordingly, at S507 in FIG. 5, the correction change amount integrated value CTLchCΣ is updated to C12 as indicated by expression (1). Here, the value changed from C13 to C14 is the same as the value changed from 0 to C12. In addition, the correction operation command value CTLddemC s initialized in the processing at S503 in FIG. 5 to the value of C13, which is the operation unit command value initial value (reference value). However, the correction operation change amount CTLchC remains at the value of C12 as indicated by expression (2) because the value of the correction change amount integrated value CTLchCΣ increased as much as the correction operation command value CTLddemC decreased. Similarly, the correction command value CTLc remains at C11 as indicated in expression (3) because correction operation change amount CTLchC is not changed. Meanwhile, since the reference operation unit command value CTLddemB is not changed, the reference operation unit command value CTLddemB and reference command value CTLb remain at C15. Accordingly, the target position CTLg remains at C16 as indicated by expression (5) because the reference command value CTLb and the correction command value CTLc are not changed. As described above, since the target position CTLg is not changed even though the initialization of the correction operation command value CTLddemC is performed, it is possible to restore the change range of the correction operation command value CTLddemC and maintain the images being picked up.

During the time from T14 to T15, if the reference operation unit command value CTLddemB is changed from C15 to C18 by operation of the main operator, the reference command value CTLb is also changed from C15 to C18. On the other hand, the correction operation command value CTLddemC is not changed and remains at C13. Here, the processing at S507 in FIG. 5 has not been performed since T14, the correction change amount integrated value CTLchCΣ remains at C12. Likewise, the correction operation change amount CTLchC is C12 as indicated in expression (2). The correction command value CTLc is also C11 as indicated in expression (3). Accordingly, the target position CTLg is changed from C16 to C19 as indicated by expression (5). Here, the change amount from C15 to 018 is the same as that from C16 to C19.

Meanwhile, during the time from T14 to T15, the reference operation unit command value CTLddemB is changed from C15 to C18. Accordingly, in the processing at S602 in FIG. 6, it is judged that the change amount per unit time of the reference operation unit command value CTLddemB has exceeded the threshold from which that the shooting target is judged to have changed. As a result, the processing proceeds to S502 in the processing at S509 in FIG. 5, the correction operation command value CTLddemC, the correction change amount integrated value CTLchCΣ, and the correction operation change amount CTLchC are initialized to 0. Since the correction operation change amount CTLchC is 0, the correction command value CTLc turns to 0 as indicated by expression (3). Meanwhile, at time T15, the reference operation unit command value CTLddemB remains at C18, and the reference command value CTLb is also at C18. Consequently, since the value of the reference command value CTLb is C18 and the correction command value CTLc is 0, the target position CTLg turns to C18 as indicated by expression (5).

As described above, it is possible to clear the correction operation change amount CTLchC and the correction command value CTLc at a timing that is judged not to affect images being picked up. As a result, the operation range of the main operator is not limited by the correction command value CTLc.

Although this embodiment was described taking an example of a drive command for the focus lens position, the target position of optical unit can be determined for drive commands of a zoom lens and an iris diaphragm in the same manner.

In this embodiment, the target position CTLg, the reference command value CTLb, the correction command value CTLc, the operation sensitivity G, and the correction operation change amount CTLchC are determined in the lens unit 10. However, the same effect can be obtained even if a part of or all of the values are determined in any of the camera 11 and the operation unit 12, 13, and 14.

As described above, in a system in which a sub-operator different from the main operator corrects the image capture condition, the present, invention makes it possible to make a fine adjustment to the image capture condition according to the operation sensitivity of the sub-operator. In addition, it is possible to provide an image pickup system in which operation of a sub-operator does not affect the operation sensitivity of the main operator, without adding multiple separate unit for changing image capture conditions.

Embodiment 2

Figure 9:
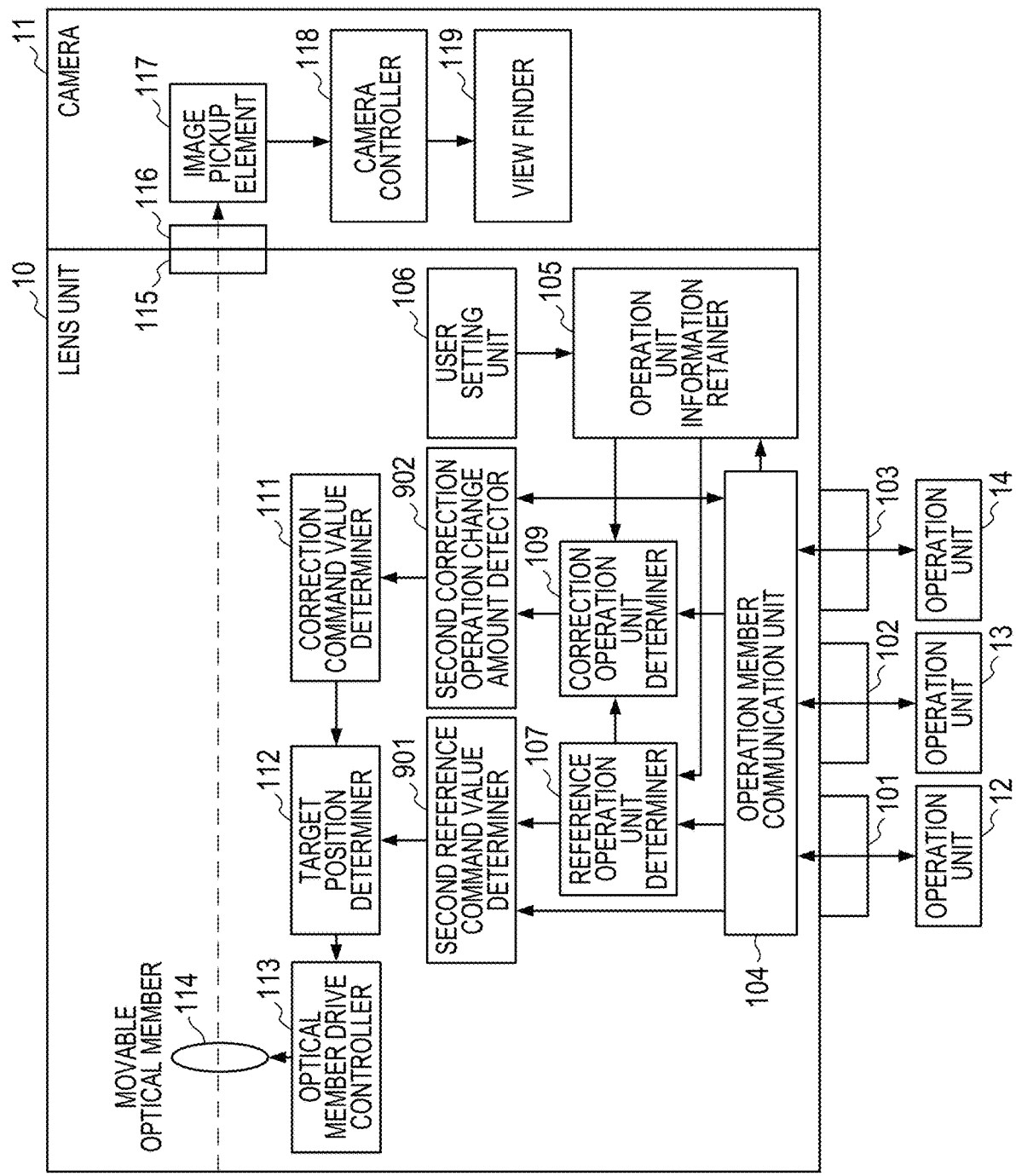
FIG. 9 is a configuration block diagram of Embodiment 2.

Next, a second embodiment of the present invention will be described using FIG. Although in the control apparatus of Embodiment 1, the reference operation unit has an operation range limit and the correction operation unit does not have an operation range limit, a control apparatus of Embodiment 2 described below is for the case where neither the reference operation unit or the correction operation unit has an operation range limit. FIG. 9 is a configuration block diagram of this embodiment, in which the same constituents as in FIG. 1 are denoted by the same reference symbols.

In FIG. 9, a second reference command value determiner 901 is a reference command value determiner for determining the reference command value, which is the operation command value of the main operator. A second correction operation change amount detector 902 is a correction operation chance amount detector for detecting the change amount of the correction command value, which is the operation command value of the sub-operator. The second reference command value determiner 901 and the second correction operation change amount detector 902 are, for example, included in a processor of a CPU.

The differences in an image pickup system of this embodiment from Embodiment 1 illustrated in FIG. 1 are as follows. This embodiment has the second reference command value determiner 901 instead of the reference command value determiner 108. This embodiment has the second correction operation change amount detector 902 instead of the correction operation change amount detector 110. The second correction operation change amount detector 902 notifies the second reference command value determiner of the operation unit command value initializing timing. The second reference command value determiner 901 acquires the optical member target position from the target position determiner 112. These differences from Embodiment 1 will be described in detail later.

The processing at the reference operation unit determiner 107 until the reference operation unit is determined based on the operation unit information is the same as that in Embodiment 1.

The second reference command value determiner 901 acquires the operation unit command value of the reference operation unit determined by the reference operation unit determiner 107 as the reference operation unit command value CTLddemB from the operation unit communication unit 104. The second reference command value determiner 901 determines the reference command value CTLb based on the reference operation unit command value CTLddemB, and notifies the target position determiner 112 of it.

Meanwhile, the second correction operation change amount detector 902 determines the correction operation change amount CTLchC from the operation unit command value CTLddemC of the correction operation unit determined by the correction operation unit determiner 109, and notifies the correction command value determiner 111 of it. The second correction operation change amount detector 902 also notifies the second reference command value determiner 901 of a timing for initializing the operation unit command value CTLddemC.

How to determine the reference command value CTLb and the correction operation change amount CTLchC will be described later.

After that, the target position CTLg, which is the final target position of the movable optical unit, is determined in the processing similar to Embodiment 1, and then, the optical member drive controller 113 drives the movable optical member 114 to the determined the target position CTLg.

Meanwhile, the light having passed through the movable optical member 114 passes through the mounts 115 and 116, and is received by the image pickup element 117. The light is converted by a photoelectric conversion to an image electrical signal, which is outputted to the camera controller 118. The camera controller 116 converts the image electrical signal into a video signal, and outputs it to the view finder 119. The view finder 119 displays the video signal outputted from the camera controller 118 on the view finder.

With the above configuration, it is possible to operate the movable optical member 114 by operation of the main operator, and also possible to drive the movable optical member 114 according to the amount of change operated by the sub-operator, also in the case where neither the reference operation unit or the correction operation unit has an operation range limit.

Next, descriptions will be provided below for how to determine the reference command value CTLb and the correction operation change amount CTLchC using FIG. 10.

The processing for determining the reference command value CTLb and the correction operation change amount CTLchC is executed at the second reference command value determiner 901 and the second correction operation change amount detector 902. FIG. 10 illustrates a flowchart for the second reference command value determiner 901 and the second correction operation change amount detector 902 to determine the reference command value CTLb and the correction operation change amount CTLchC. In the following explanation, how to determine the reference command value CTLb and the correction operation change amount CTLchC will be described in the case where the operation unit 12 is determined as reference operation unit and the operation unit 13 is determined as correction operation unit.

Processing is started at S1001, and proceeds to S1002.

At S1002, a correction operation change amount CTLchC2 is initialized to 0, and the processing proceeds to S1003.

At S1003, a request is made to the operation unit 13 via the operation unit communication unit 104 to initialize the operation unit command value CTLdem2 to the operation unit command value initial value CTLdem2Ini, and the processing proceeds to S1004. Here, it is desirable that the operation unit command value initial value CTLdem2Ini be at the center value in the range of the values that the operation unit command value CTLdem2 can take so that change amounts of the operation unit command value CTLdem2 with reference to the operation unit command value initial value CTLdem2Ini can be maximum in both increasing and decreasing directions.

At S1004, it is checked if the time that it takes for the operation unit communication unit 104 to receive the operation unit command value CTLdem2 updated at S1003 has passed. If the time has passed, the processing proceeds to S1005. Here, the time to wait at S1004 is set to a predetermined time in advance.

At S1005, the operation unit command value CTLdem1 and the operation unit command value CTLdem2 are acquired from the operation unit communication unit 104, and the processing proceeds to S1004.

At S1006, it is judged whether it is a timing for initializing the operation unit command value CTLdem2. If it is an initializing timing, the processing proceeds to S1007, and if not, the processing proceeds to S1008. The timing for initializing the operation unit command value CTLdem2 is, for example, the time when the operation unit command value CTLdem2 does not change for a certain time, or when the correction operation change amount CTLchC exceeds a specified value.

At S1007, the second reference command value determiner 901 makes a request to the operation unit 12 to update the operation unit command value CTLdem1 such that the operation unit command value CTLdem1 agrees with the target position CTLg. After making the request of updating the operation unit command value CTLdem1, the processing proceeds to S1009.

At S1008, the operation unit 12 updates the operation unit command value CTLdem1, and it is checked if the time that it takes for the operation unit communication unit 104 to receive the updated operation unit command value CTLdem1 has passed. If the time has passed, the processing proceeds to S1003. Here, the time to wait at S1008 is set to a predetermined time in advance.

At S1009, the correction operation change amount CTLchC is updated as indicated by the following expression (6), and the processing proceeds to S1010.

$$CTLchC = CTLdem2 - CTLdem2Ini \quad (6)$$

At S1010, the acquired operation unit command value CTLdem1 is determined as the reference command value CTLb, and the processing proceeds to S1005.

With the above method, the reference command value CTLb and the correction operation change amount CTLchC are determined.

Figure 10:
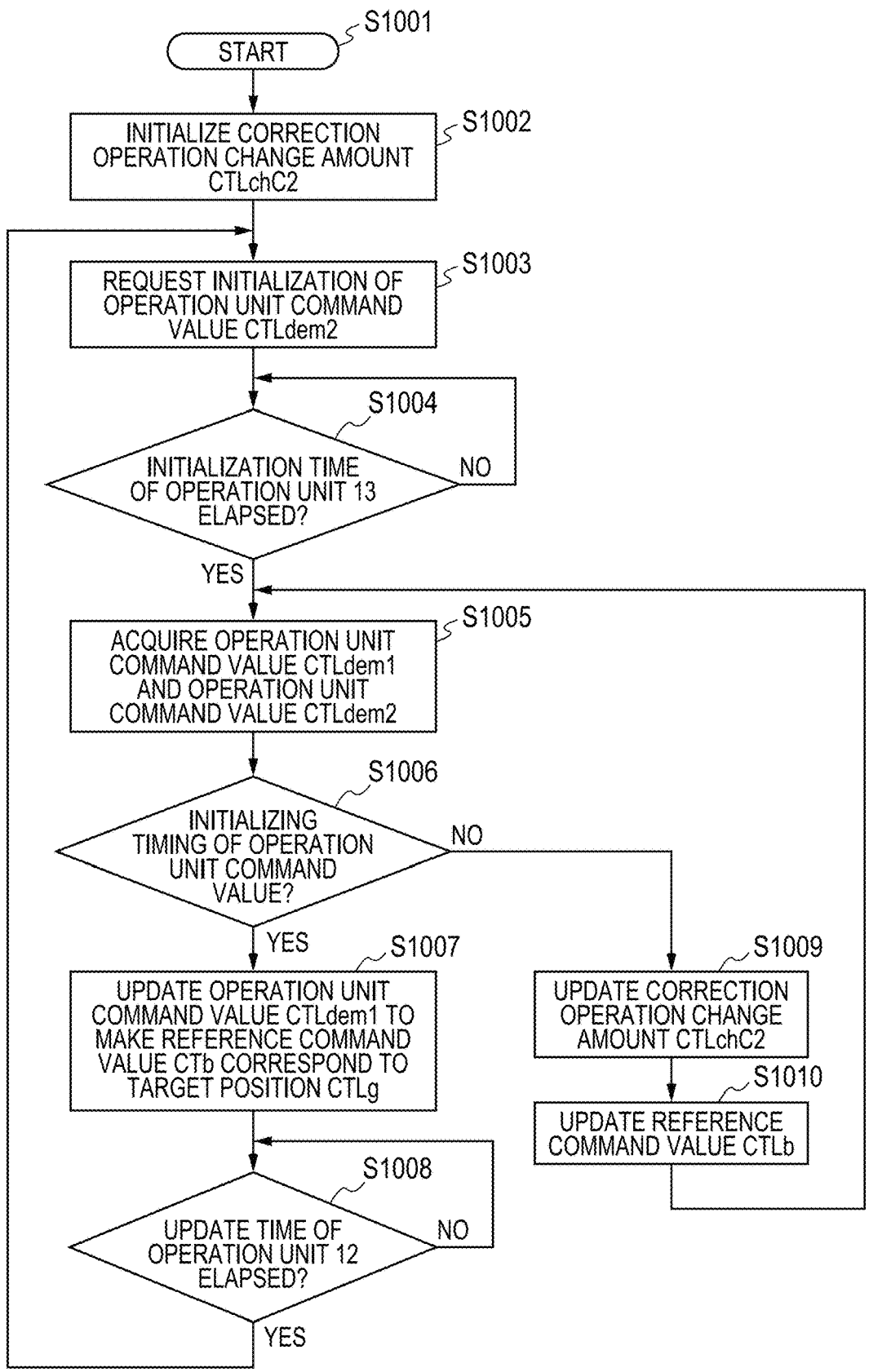
FIG. 10 is a flowchart for determining a reference command value CTLb and a correction operation change amount CTLchC.

Next, descriptions will be provided for changes on the time axis of the target position CTLg, the reference command value CTLb and reference operation unit command value CTLddemB, the correction command value CTLc, the correction operation change amount CTLchC, and the correction operation command value CTLddemC in the flowchart illustrated in FIG. 10.

The following descriptions are for the case where the reference operation unit command value CTLddemB agrees with the reference command value CTLb, and the operation sensitivity G of the correction operation command value CTLddemC is ½.

Figure 11A:
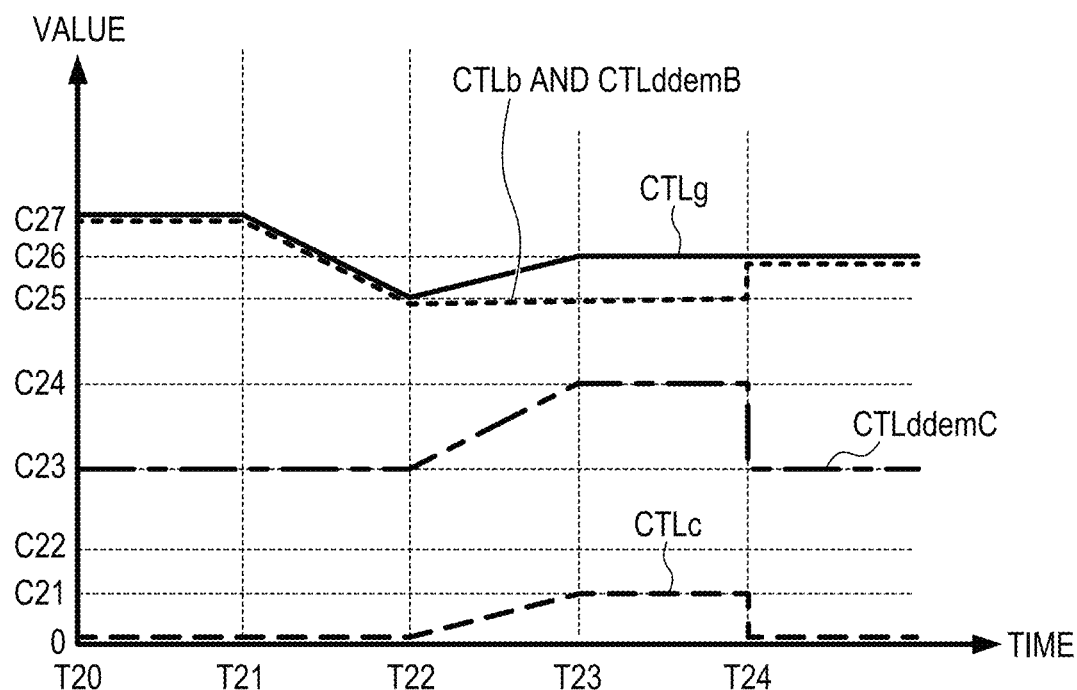
FIG. 11A is a diagram for explaining changes of each value in the case where an operation sensitivity G of CTLb is fixed in Embodiment 2.
Figure 11B:
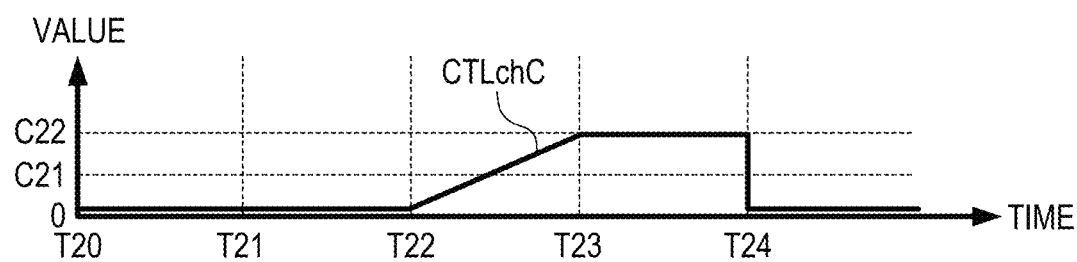
FIG. 11B is a diagram for explaining changes of each value in the case where the operation sensitivity G of CTLb is fixed in Embodiment 2.

FIG. 11A illustrates changes on the time axis of the target position CTLg, the reference command value CTLb and reference operation unit command value CTLddemB, the correction command value CTLc, and the correction operation command value CTLddemC. FIG. 11B illustrates changes on the time axis of the correction operation change amount CTLchC. The vertical axes of FIGS. 11A and 11B represent the target position, the command values, and the change amounts, and the horizontal axes represent a lapse of time. In FIGS. 11A and 11B, the values of the same symbols on the vertical axes are the same, and the same symbols on the horizontal axes indicate the same times.

At time T20, the respective values when the processing from S1001 to S1005 in FIG. 10 is completed are indicated. At T20, the correction operation change amount CTLchC have been initialized to 0 in the processing at S1002 in FIG. 10. The correction operation command value CTLddemC has been initialized in the processing at S1003 in FIG. 10 to the value of C23 which is the operation unit command value initial value. In addition, the correction command value CTLc is 0 as indicated by expression (3) because the correction operation change amount CTLchC is 0. Meanwhile, suppose that the reference operation unit command value CTLddemB is C27 at time T20. Accordingly, the reference command value CTLb is also C27. With the above, the target position CTLg is C27 as indicated by expression (5) because the value of the reference command value CTLb is C27, and the value of the correction command value CTlc is 0.

During the time from T21 to T22, when the reference operation unit command value CTLddemB is changed from C27 to C25 by operation of the main operator, the reference command value CTLb also changes from C27 to C25. On the other hand, the correction operation command value CTLddemC is not changed, and remains at C23. Similarly, the correction operation change amount CTLchC is also at 0 as indicated in expression (6). The correction command value CTLc is also at 0 as indicated in expression (3) because the correction operation change amount CTLchC is 0. Accordingly, the target position CTLg changes from C27 to C25 as indicated in expression (5).

During the time from T22 to T23, when the correction operation command value CTLddemC is changed from C23 to C24 by operation of the sub-operator, the correction operation change amount CTLchC changes from 0 to C22 as indicated by expression (6). Here, the value changed from C23 to C24 is the same as the value changed from 0 to C22. Accordingly, the correction command value CTLc turns to C21, which is half the value of C22, as indicated expression (3) because the operation sensitivity G is ½. On the other hand, since the reference operation unit command value CTLddemB is not changed, the reference operation unit command value CTLddemB and reference command value CTLb remain at C25. Hence, the target position CTLg is changed from C25 to C26 as indicated expression (5). Here, the value changed from C25 to C26 is the same as the value changed from 0 to C21.

During the time from T23 to T24, since there is no change in the reference operation unit command value CTLddemB and the correction operation command value CTLddemC, each value is not changed from at T23. Hence, at T24, the processing at S1006 in FIG. 10 judges that it is a timing for initializing the correction operation command value CTLddemC, and the processing proceeds to S1007 in FIG. 10. At S1007 in FIG. 10, the reference operation unit command value CTLddemB is updated to the value that agrees with the target position CTLg. In other words, the correction operation command value CTLddemC is updated to the value of C23 immediately before the initializing timing T24, and at S1003 in FIG. 10. Since the correction operation unit command value CTLddemC has been initialized to the value of C23, the correction operation change amount CTLchC also turns to 0 as indicated in expression (6). In addition, since correction operation change amount CTLchC is 0, the correction command value CTLc also turns to 0 as indicated by expression (3). Here, although the correction command value CTLc is 0, the reference operation unit command value CTLddemB agrees with the target position CTLg. As a result, the reference command value CTLb also agrees with the target position CTLg, and the target position CTLg remains at C26 as indicated by expression (5).

As described above, this embodiment makes possible updating to the reference command value CTLb taking the correction command value CTLc into account and initialization of the operation unit command value CTLdem2 in the processing at S1003 and S1007 in FIG. 10.

Thus, clearing the correction command value does not cause a change in the image capture condition and affect images being picked up, and at the same time it is possible to solve the problem that the operation range of the main operator is limited by the correction command value CTLc.

Figure 12:
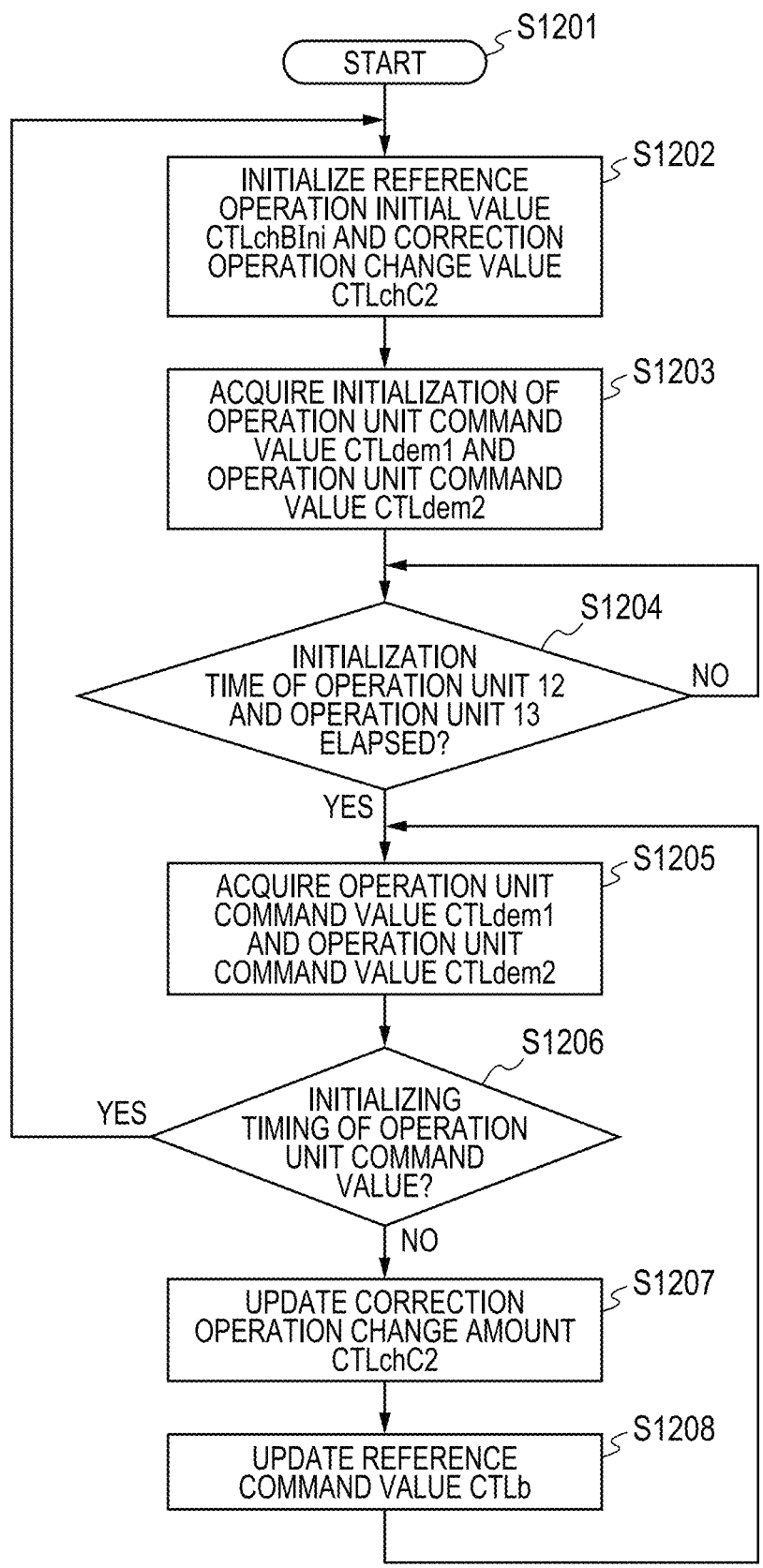
FIG. 12 is a flowchart for determining CTLb and CTLchC in the case where the operation sensitivity G of CTLb changes.

Next, descriptions will be provided using FIG. 12 for the case where the operation sensitivity G of the reference command value CTLb is changed.

The processing to determine the reference command value CTLb and the correction operation change amount CTLchC in the case the operation sensitivity G of the reference command value CTLb is changed is executed at the second reference command value determiner 901 and the second correction operation change amount detector 902.

FIG. 12 illustrates a flowchart for the second reference command value determiner 901 and the second correction operation change amount detector 902 to determine the reference command value CTLb and the correction operation change amount CTLchC in the case of changing the operation sensitivity G of the reference command value CTLb.

In the following explanation, how to determine the reference command value CTLb and the correction operation change amount CTLchC will be described in the case where the operation unit 12 is determined as reference operation unit and the operation unit 13 is determined as correction operation unit.

Processing is started at S1201, and proceeds to S1202.

At S1202, a reference operation initial value CTLchBIni is initialized to the target position CTLg, the correction operation change amount CTLchC2 is initialized to 0, and the processing proceeds to S1203.

At S1203, a request is made to the operation unit 12 via the operation unit communication unit 104 to initialize the operation unit command value CTLdem1 to the operation unit command value initial value CTLdem1Ini. In addition, a request is made to the operation unit 13 via the operation unit communication unit 104 to initialize the operation unit command value CTLdem2 to the operation unit command value initial value CTLdem2Ini. After the requests for initializing the operation unit command value CTLdem1 and the operation unit command value CTLdem2 are made, the processing proceeds to S1204. Here, it is desirable that the operation unit command value initial value CTLdem1Ini be at the center value in the range of the values that the operation unit command value CTLdem1 can take so that change amounts of the operation unit command value CTLdem1 with reference to the operation unit command value initial value CTLdem1Ini can be maximum in both increasing and decreasing directions. In addition, it is desirable that the operation unit command value initial value CTLdem2Ini be at the center value in the range of the values that the operation unit command value CTLdem2 can take so that change amounts of the operation unit command value CTLdem2 with reference to the operation unit command value initial value CTLdem2Ini can be maximum in both increasing and decreasing directions.

At S1204, it is checked if the time that it takes for the operation unit communication unit 104 to receive the operation unit command value CTLdem1 and operation unit command value CTLdem2 operation unit command value CTLdem2 updated at S1203 has passed. If the time has passed, the processing proceeds to S1205. Here, the time to wait at S1204 is set to a predetermined time in advance.

At S1205, the operation unit command value CTLdem1 and the operation unit command value CTLdem2 are acquired from the operation unit communication unit 104, and the processing proceeds to S1204.

At S1206, it is judged whether it is a timing for initializing the operation unit command value CTLdem2. If it is an initializing timing, the processing proceeds to S1202, and if not, the processing proceeds to S1208. The timing for initializing the operation unit command value CTLdem2 is, for example, the time when the operation unit command value CTLdem1 and the operation unit command value CTLdem2 has not changed for a certain time, or it is the time when the correction operation change amount CTLchC and the difference between CTLdem1 and CTLdem1Ini exceed a specified value.

At S1207, the correction operation change amount CTLchC is updated indicated by the expression (6) described earlier, and the processing proceeds to S1208.

At S1208, the reference command value CTLb is updated as indicated in the following expression (7), and the processing proceeds to S1205.

$$CTLb = CTLchBIni + ((CTLdem1 - CTLdem1Ini) + G) \quad (7)$$

Here, the operation sensitivity G is set to a certain value according to the method described in Embodiment 1.

With the above method, the reference command value CTLb and the correction operation change amount CTLchC are determined in the case of changing the operation sensitivity G of the reference command value CTLb.

Figure 13A:
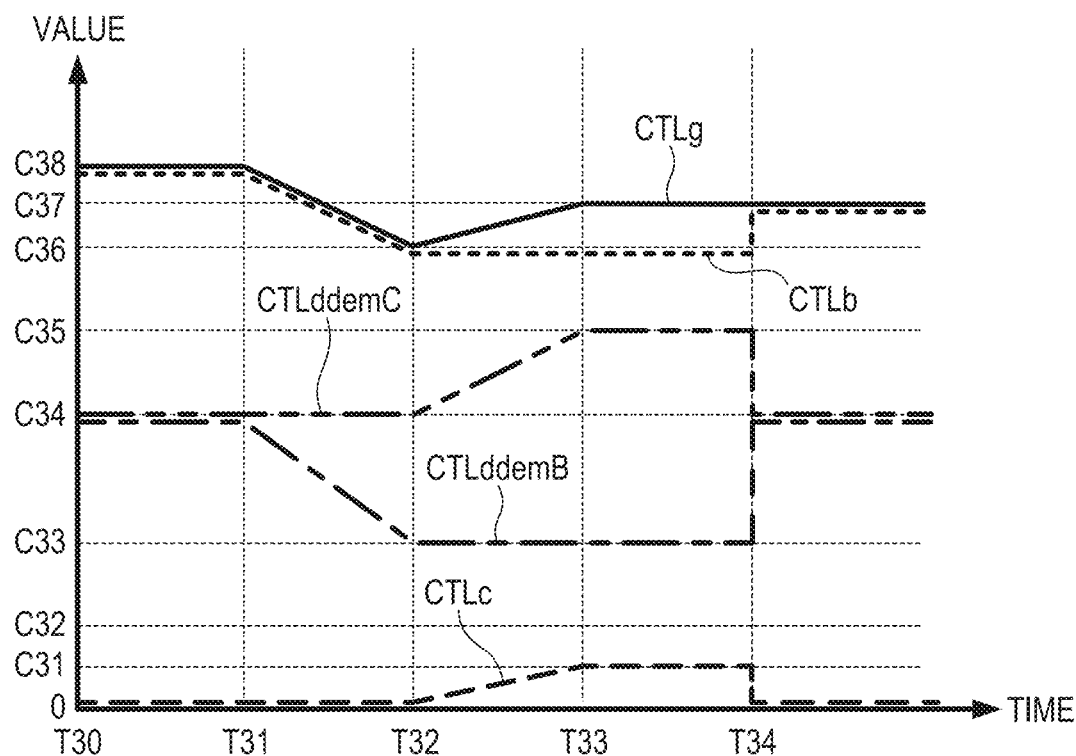
FIG. 13A is a diagram explaining changes of each value in the case where the operation sensitivity G of CTLb changes in Embodiment 2.
Figure 13B:
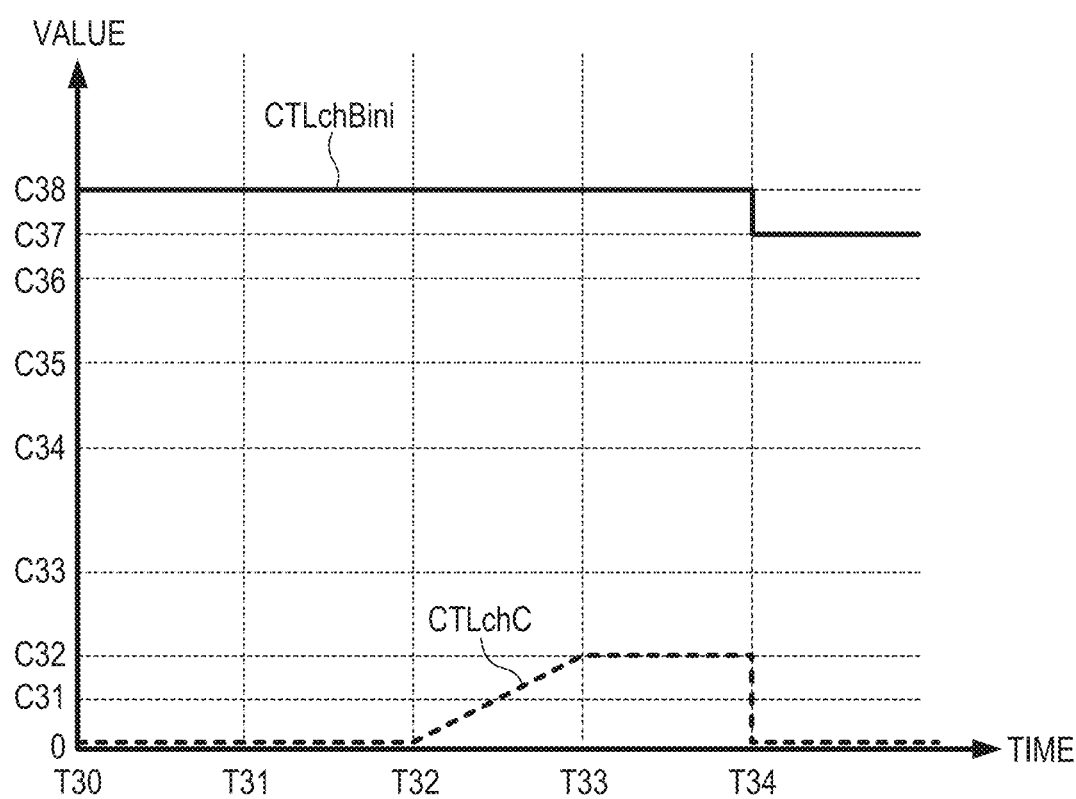
FIG. 13B is a diagram explaining changes of each value in the case where the operation sensitivity G of CTLb changes in Embodiment 2.

Next, descriptions will be provided for changes on the time axis of the target position CTLg, the reference command value CTLb, the reference operation initial value CTLchBIni, the correction command value CTLc, the correction operation change amount CTLchC, the reference operation unit command value CTLddemB, and the correction operation command value CTLddemC. The following descriptions are for the case where the operation sensitivity Gb of the reference operation unit command value CTLddemB is ⅔, and the operation sensitivity G of the correction operation command value CTLddemC is ½. FIG. 13A illustrates changes on the time axis of the target position CTLg, the reference command value CTLb, the correction command value CTLc, the reference operation unit command value CTLddemB, and the correction operation command value CTLddemC. FIG. 13B illustrates changes on the time axis of the reference operation initial value CTLchBIni and the correction operation change amount CTLchC. The vertical axes of FIGS. 13A and 13B represent the target position, the command values, and the change amounts, and the horizontal axes represent a lapse of time. In FIGS. 13A and 13B, the values of the same symbols on the vertical axes are the same, and the same symbols on the horizontal axes indicate the same times.

At time T30, the respective values when the processing from S1201 to S1205 in FIG. 12 is completed are indicated.

At T30, the reference operation initial value CTLchBIni and the correction operation change amount CTLchC, have been to the target position CTLg at T30 and 0, respectively, in the processing at S1202 in FIG. 12.

The reference operation unit command value CTLddemB and the correction operation command value CTLddemC have been initialized to the value of C34 which is the operation unit command value initial value in the processing at S1203 in FIG. 12. Since the reference operation unit command value CTLddemB is initialized to the value of C34 and the reference operation initial value CTLchBIni agrees with the target position CTLg, the value of the reference command value CTLb agrees with the target position CTLg as indicated by expression (7). Meanwhile, since the correction operation change amount CTLchC is 0, the value of the correction command value CTLc is 0 as indicated by expression (3). Accordingly, since the value of the reference command value CTLb is C38 and the value of the correction command value CTLc is 0, the target position CTLg is C38 as indicated by expression (5).

During the time from T31 to T32, in the case the reference operation unit command value CTLddemB is changed from C34 to C33 by operation of the main operator, the reference command value CTLb turns to C36 as indicated by expression (7). Here, the change amount from C34 to C33 is 3/2 times the change amount from C38 to C36. On the other hand, the correction operation command value CTLddemC is not changed, and remains at C34. Similarly, the correction operation change amount CTLchC is also 0 as indicated in expression (6). The correction command value CTLc is also 0 as indicated in expression (3) because the correction operation change amount CTLchC is 0. Accordingly, the target position on CTLg changes from C38 to C36 as indicated in expression (5).

When the correction operation command value CTLddemC is changed from C34 to C35 by operation of the sub-operator during the time from T32 to T33, the correction operation change amount CTLchC changes from 0 to C32 as indicated by expression (6). Here, the change amount from C34 to C35 is the same as the change amount from 0 to C32. Accordingly, the correction command value CTLc turns to C31, which is half the value of C32, as indicated expression (3) because the operation sensitivity G is ½. On the other hand, since the reference operation unit command value CTLddemB is not changed, the reference command value CTLb remains at C36. Accordingly, the target position CTLg is changed from C36 to C37 as indicated expression (5). Here, the value changed from C36 to C37 is the same as the value changed from 0 to C31.

During the time from T33 to T34, since there is no change in the reference operation unit command value CTLddemB and the correction operation command value CTLddemC, each value is not changed from at T33.

There is also no change in the correction operation command value CTLddemC during the time lapse from T33 to T34. Thus, at T34, it is judged in the processing at S1206 in FIG. 12 that it is a timing for initializing the correction operation command value CTLddemC, and the processing proceeds to S1202 in FIG. 12. As a result, the reference operation initial value CTLchBIni and the correction operation change amount CTLchC are initialized to the target position CTLg at T34 and 0, respectively, in the processing at S1202 in FIG. 12. In addition, the reference operation unit command value CTLddemB and the correction operation command value CTLddemC are initialized to the value of C34, which is the operation unit command value initial value in the processing at S1203 in FIG. 12. Moreover, since the reference operation unit command value CTLddemB is initialized to the value of C34 and the reference operation initial value CTLchBIni agrees with the target position CTLg, the value of the reference command value CTLb agrees with the target position CTLg as indicated by expression (7). As a result, even after it is judged in the processing at S1206 in FIG. 12 that it is a timing for initializing the correction operation command value CTLddemC, target position CTLg remains at C37 and does not change as indicated by expression (5).

As described in the above embodiment, the same effect as the processing indicated in the flowchart in FIG. 10 can be obtained. In addition, it is possible to change the operation sensitivity G of the reference command value CTLb to the optimum operation sensitivity according to the purpose of shooting.

Although this embodiment was described taking an example of a drive command for the focus lens position, the target position of an optical member can be determined for the drive commands of a zoom lens and an iris diaphragm in the same manner.

In this embodiment, the target position CTLg, the reference command value CTLb, the correction command value CTLc, the operation sensitivity G, and the correction operation change amount CTLchC are determined in the lens unit 10. However, the same effect can be obtained even if a part of or all of the values are determined in any of the camera 11 and the operation unit 12, 13, and 14.

As described above, in the system in which a sub-operator different from the main operator corrects the image capture condition, the present invention makes it possible to make a fine adjustment to the image capture condition according to the operation sensitivity of the sub-operator. In addition, it is possible to provide an image pickup system in which operation of a sub-operator does not affect the operation sensitivity of the main operator, without adding multiple separate unit for changing image capture conditions.

In addition, compared to Embodiment 1, there is no need to initialize the correction operation change amount CTLchC. Hence, it is possible to provide an image pickup system in which no change in images being picked up occurs, which is otherwise caused by the change of the target position CTLg, and which occurs in Embodiment 1 at the initialization of the correction operation change amount CTLchC.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200826, filed Oct. 12, 2016, which is hereby incorporated by reference herein in its entirety.

What is claimed is:

1. A control apparatus which performs control of a movable optical member of an optical apparatus based on a first operation amount of a first operation device and a second operation amount of a second operation device, the apparatus comprising:
   a storage that stores information of a first operation sensitivity of the first operation device and a second operation sensitivity of the second operation device; and
   a processor configured to generate a target value for the control based on the first operation amount, the second operation amount, and the stored first operation sensitivity and the stored second operation sensitivity,
   wherein the first operation amount corresponds to a reference for the control and the second operation amount corresponds to a correction to the reference for the control, and
   wherein the processor is configured to reduce a contribution of the second operation amount in a case where a change amount in a state of the optical apparatus based on the first operation amount per unit time is not smaller than a threshold.

2. The control apparatus according to claim 1, wherein the second operation sensitivity is lower than the first operation sensitivity.

3. The control apparatus according to claim 1, wherein the processor is configured to change the second operation sensitivity based on a state of the optical apparatus.

4. The control apparatus according to claim 3, wherein the processor is configured to change the second operation sensitivity based on a depth of field of the optical apparatus.

5. The control apparatus according to claim 3, wherein the processor is configured to change the second operation sensitivity based on a focal length of the optical apparatus.

6. A control apparatus which performs control of a movable optical member of an optical apparatus based on a first operation amount of a first operation device and a second operation amount of a second operation device, the apparatus comprising:
   a storage that stores information of a first operation sensitivity of the first operation device and a second operation sensitivity of the second operation device; and
   a processor configured to generate a target value for the control based on the first operation amount, the second operation amount, and the stored first operation sensitivity and the stored second operation sensitivity,
   wherein the first operation amount corresponds to a reference for the control and the second operation amount corresponds to a correction to the reference for the control,
   wherein the storage stores information of a third operation sensitivity of a third operation device, and the processor is configured to generate the target value further based on a third operation amount of the third operation device and the third operation sensitivity, the third operation amount corresponding to a correction to the reference for the control.

7. The control apparatus according to claim 1, wherein the first operation device has a limit in an operation range thereof.

8. The control apparatus according to claim 6, wherein the first operation device has a limit in an operation range thereof.

9. A control apparatus which performs control of a movable optical member of an optical apparatus based on a first operation amount of a first operation device and a second operation amount of a second operation device, the apparatus comprising:
   a storage that stores information of a first operation sensitivity of the first operation device and a second operation sensitivity of the second operation device; and
   a processor configured to generate a target value for the control based on the first operation amount, the second operation amount, and the stored first operation sensitivity and the stored second operation sensitivity,
   wherein the first operation amount corresponds to a reference for the control and the second operation amount corresponds to a correction to the reference for the control, and
   wherein the processor is configured to cause a contribution of the second operation amount to be reduced in a case where a time for which the second operation amount has not changed exceeds a threshold.

10. The control apparatus according to claim 9, wherein the processor is configured to cause the first operation amount to be changed in the case where the contribution of the second operation amount is caused to be reduced, so that the target value is not changed.

11. The control apparatus according to claim 9, wherein the first operation device has a limit in an operation range thereof.

12. A lens apparatus comprising:
a movable optical member; and
a control apparatus according to claim 1, which performs control of the movable optical member.

13. An imaging apparatus comprising:
a lens apparatus including a movable optical member;
a control apparatus according to claim 1, which performs control of the movable optical member; and
an image pickup element configured to receive light via the movable optical member.

14. A lens apparatus comprising:
a movable optical member; and
a control apparatus according to claim 6, which performs control of the movable optical member.

15. An imaging apparatus comprising:
a lens apparatus including a movable optical member;
a control apparatus according to claim 6, which performs control of the movable optical member; and
an image pickup element configured to receive light via the movable optical member.

16. A lens apparatus comprising:
a movable optical member; and
a control apparatus according to claim 9, which performs control of the movable optical member.

17. An imaging apparatus comprising:
a lens apparatus including a movable optical member;
a control apparatus according to claim 9, which performs control of the movable optical member; and
an image pickup element configured to receive light via the movable optical member.

* * * * *